United States Patent
Hwang et al.

(10) Patent No.: US 11,387,058 B2
(45) Date of Patent: Jul. 12, 2022

(54) INPUT DEVICE

(71) Applicants: Hyundai Motor Company, Seoul (KR); Kia Motors Corporation, Seoul (KR); Panasonic Corporation, Kadoma (JP)

(72) Inventors: Seung Hai Hwang, Gyeonggi-do (KR); Seung Bo Lee, Gyeonggi-do (KR); Hideto Sadamori, Okayama-ken (JP); Yu Hasegawa, Okayama-ken (JP); Takumi Nishimoto, Okayama-ken (JP); Akira Matsumoto, Okayama-ken (JP)

(73) Assignees: Hyundai Motor Company, Seoul (KR); Kia Motors Corporation, Seoul (KR); Panasonic Corporation, Kadoma (JP)

( * ) Notice: Subject to any disclaimer, the term of this patent is extended or adjusted under 35 U.S.C. 154(b) by 0 days.

(21) Appl. No.: 16/486,421

(22) PCT Filed: Feb. 26, 2018

(86) PCT No.: PCT/KR2018/002320
§ 371 (c)(1),
(2) Date: Aug. 15, 2019

(87) PCT Pub. No.: WO2018/155975
PCT Pub. Date: Aug. 30, 2018

(65) Prior Publication Data
US 2020/0051764 A1 Feb. 13, 2020

(30) Foreign Application Priority Data

Feb. 27, 2017 (JP) .............................. JP2017-034300

(51) Int. Cl.
*H01H 25/06* (2006.01)
*B60R 16/00* (2006.01)
*H01H 13/14* (2006.01)
*H01H 19/14* (2006.01)
*H01H 25/00* (2006.01)
*H01H 25/04* (2006.01)

(52) U.S. Cl.
CPC ........... *H01H 25/06* (2013.01); *B60R 16/005* (2013.01); *H01H 13/14* (2013.01); *H01H 19/14* (2013.01); *H01H 25/006* (2013.01); *H01H 25/04* (2013.01)

(58) Field of Classification Search
CPC ........ H01H 25/06; H01H 13/14; H01H 19/14; H01H 25/006; H01H 25/04; H01H 25/00;
(Continued)

(56) References Cited

U.S. PATENT DOCUMENTS 6,219,036 B1 * 4/2001 Urita .................... G06F 1/1616
345/157
6,377,239 B1 4/2002 Isikawa
(Continued)

FOREIGN PATENT DOCUMENTS

JP 2004-139845 A 5/2004
JP WO2005/101437 A1 3/2008
(Continued)

*Primary Examiner* — Lheiren Mae A Caroc
(74) *Attorney, Agent, or Firm* — Fox Rothschild LLP

(57) ABSTRACT

An input device is configured to provide input to various electronic devices. The input device includes: a manipulation unit; a substrate; a tilting mechanism; and a detector. The manipulation unit includes a handle which is rotatable around a rotation axis and is pressed along the rotation axis, and outputs a first signal corresponding to rotation of the handle and a second signal corresponding to pressing of the handle. The tilting mechanism includes a cylindrical shaft fixed to the substrate, and a bearing fixed to the body, wherein the shaft is perpendicular to the rotation axis, and the tilting mechanism allows the substrate to swing around the shaft between a first manipulation position and a second manipulation position. The detector is disposed on the
(Continued)

surface of the substrate facing the body, and outputs a third signal when the substrate is in the second manipulation position.

8 Claims, 32 Drawing Sheets

(58) Field of Classification Search
CPC ..... B60R 16/005; B60R 16/00; G06F 3/0202; G06F 3/0362; G06F 1/184; H05K 7/142; H05K 7/06; H05K 3/301; H06F 1/185
USPC .............................................. 200/4, 6 a, 6 r
See application file for complete search history.

(56) References Cited

U.S. PATENT DOCUMENTS

| | | | | |
|---|---|---|---|---|
| 6,621,016 B2* | 9/2003 | Ohba | ................... | H01H 25/041 200/11 R |
| 6,636,197 B1* | 10/2003 | Goldenberg | ............. | G05G 1/08 345/156 |
| 6,686,911 B1* | 2/2004 | Levin | ..................... | G05G 9/047 345/156 |
| 6,762,372 B2* | 7/2004 | Nishimoto | ........... | H01H 25/041 200/18 |
| 6,953,901 B2 | 10/2005 | Onodera | | |
| 7,978,186 B2 | 7/2011 | Vassallo et al. | | |
| 8,941,585 B2* | 1/2015 | Minamitani | .............. | G06F 3/02 345/156 |
| 9,329,616 B2 | 5/2016 | Mueller et al. | | |
| 2004/0060807 A1* | 4/2004 | Nishimoto | ........... | H01H 25/041 200/553 |
| 2004/0140950 A1 | 7/2004 | Onodera | | |
| 2015/0020630 A1 | 1/2015 | Mueller et al. | | |
| 2015/0185757 A1 | 7/2015 | Jantke | | |
| 2016/0012584 A1 | 1/2016 | Gaudio | | |

FOREIGN PATENT DOCUMENTS

| | | |
|---|---|---|
| KR | 10-2012-0039188 A | 4/2012 |
| KR | 10-2015-0028817 A | 3/2015 |
| KR | 10-1584215 B1 | 1/2016 |

* cited by examiner

INPUT DEVICE

CROSS-REFERENCE TO RELATED APPLICATION(S)

This application is a National Phase of PCT International Application No. PCT/KR2018/002320 with an International Filing Date of Feb. 26, 2018, which claims under 35 U.S.C. § 119(a) the benefit of Japanese Application No. 2017-034300, filed on Feb. 27, 2017, the entire contents of which are incorporated by reference herein.

BACKGROUND

(a) Technical Field

The present disclosure relates to an input device capable of providing input to various electronic devices.

(b) Description of the Related Art

Hereinafter, an existing input device according to the related art will be described.

An existing input device includes an operation part, a rotating operation electronic part located under the operation part and coupled to the operation part, and a substrate electrically connected to the rotating operation electronic part through soldering or the like. The operation part rotates in a first direction and a second direction, and the first direction is opposite to the second direction. The input device provides output in accordance with the amount of rotation and direction of rotation of the operation part.

An example of the related art input device is disclosed in Japanese Patent Laid-Open Publication No. 2014-107170A.

However, the related art input device provides output only as it rotates in the first direction and the second direction, thus limiting the forms of inputs.

Taking the aforementioned shortcomings into consideration, exemplary embodiments of the present disclosure provide an input device capable of controlling various electronic devices.

SUMMARY

An aspect of the present disclosure provides an input device capable of providing input to various electronic devices.

An input device of one aspect according to the present disclosure includes: a manipulation unit; a first substrate; a second substrate; a tilting mechanism; and a detector. The manipulation unit includes a handle, allows rotation of the handle around a rotational axis and pressing of the handle along the rotational axis, and is configured to output a first signal according to the rotation of the handle and a second signal according to the pressing of the handle. The first substrate has a surface where the manipulation unit is attached. The second substrate is on an opposite side of the first substrate from the manipulation unit. The tilting mechanism includes a shaft in a circular cylindrical shape fixed to the first substrate perpendicularly to the rotational axis and a bearing fixed to the second substrate to support rotatably the shaft around the shaft, and allows the first substrate to swing around the shaft between a first manipulation position and a second manipulation position. The detector is mounted on a surface of the second substrate facing the first substrate, and is configured to output a third signal when the first substrate is in the second manipulation position.

An input device of one aspect according to the present disclosure includes: a manipulation unit; a body; and a detector. The manipulation unit includes a handle, allows rotation of the handle around a rotational axis and pressing of the handle along the rotational axis, and is configured to output a first signal according to the rotation of the handle and a second signal according to the pressing of the handle. The body holds the manipulation unit to allow it to move from a first manipulation position to a second manipulation position along a direction of the pressing the handle. The detector is configured to output a third signal when the manipulation unit is in the second manipulation position.

An input device of one aspect according to the present disclosure includes: a manipulation unit; a body; and a detector. The manipulation unit includes a handle, allows rotation of the handle around a rotational axis and pressing of the handle along the rotational axis, and is configured to output a first signal according to the rotation of the handle and a second signal according to the pressing of the handle. The body holds the manipulation unit to allow it to move from a first manipulation position to a second manipulation position along an opposite direction from a direction of the pressing the handle. The detector is configured to output a third signal when the manipulation unit is in the second manipulation position.

According to an aspect of the present disclosure, an input device may include: a manipulation unit; a substrate; a tilting mechanism; and a detector. The manipulation unit may include a handle which is rotatable around a rotation axis and is pressed along the rotation axis, and may output a first signal corresponding to rotation of the handle and a second signal corresponding to pressing of the handle. The substrate may have a surface to which the manipulation unit is attached. The tilting mechanism may include a cylindrical shaft fixed to the substrate, and a bearing fixed to the body, wherein the shaft may be perpendicular to the rotation axis, the bearing may rotatably support the shaft around the shaft, and the tilting mechanism may allow the substrate to swing around the shaft between a first manipulation position and a second manipulation position. The detector may be disposed on the surface of the substrate facing the body, and may output a third signal when the substrate is in the second manipulation position.

As apparent from the above embodiments, the input device (100A) of the first aspect includes: a manipulation unit (10A); a first substrate (34A); a second substrate (31A); a tilting mechanism (70A); and a detector (33A). The manipulation unit (10A) includes a handle (11A), allows rotation of the handle (11A) around a rotational axis (P10) and pressing of the handle (11A) along the rotational axis (P10). The manipulation unit (10A) is configured to output a first signal (S1A) according to the rotation of the handle (11A) and a second signal (S2A) according to the pressing of the handle (11A). The first substrate (34A) has a surface where the manipulation unit (10A) is attached. The second substrate (31A) is on an opposite side of the first substrate (34A) from the manipulation unit (10A). The tilting mechanism (70A) includes a shaft (321A) in a circular cylindrical shape fixed to the first substrate (34A) perpendicularly to the rotational axis (P10) and a bearing (43A) fixed to the second substrate (31A) to support rotatably the shaft (321A) along a circumference of the shaft (321A). The tilting mechanism (70A) allows the first substrate (34A) to swing around the shaft (321A) between a first manipulation position and a second manipulation position relative to the second substrate (31A). The detector (33A) is mounted on a surface of the second substrate (31A) facing the first substrate (34A), and is configured to output a third signal (S3A) when the first substrate (34A) is in the second manipulation position. The first aspect can provide outputs according to various manipulation inputs and therefore realize various outputs. Thereby, the input device is capable of controlling multiple electronic devices.

The input device (100A) of the second aspect would be realized in combination with the first aspect. In the second aspect, the shaft (321A) is received in a portion of the handle (11A) that projects onto the first substrate (31A). Accordingly, the second aspect can facilitate swinging of the first substrate (34A) by use of the manipulation unit (10A).

The input device (100A) of the third aspect would be realized in combination with the first or second aspect. In the third aspect, the input device (100A) further includes a recovery member (50A) configured to transmit elastic force to the first substrate (34A) to move the first substrate (34A) from the second manipulation position to the first manipulation position. According to the third aspect, handleability can be improved.

The input device (100B) of the fourth aspect includes: a manipulation unit (10B); a body (40B); and a detector (33B). The manipulation unit (10B) includes a handle (11B), allows rotation of the handle (11B) around a rotational axis (P10) and pressing of the handle (11B) along the rotational axis (P10). The manipulation unit (10B) is configured to output a first signal (S1B) according to the rotation of the handle (11B) and a second signal (S2B) according to the pressing of the handle (11B). The body (40B) holds the manipulation unit (10B) to allow it to move from a first manipulation position to a second manipulation position along a direction of the pressing the handle (11B). The detector (33B) is configured to output a third signal (S3B) when the manipulation unit (10B) is in the second manipulation position. The fourth aspect can provide outputs according to various manipulation inputs and therefore realize various outputs. Thereby, the input device is capable of controlling multiple electronic devices.

The input device (100B) of the fifth aspect would be realized in combination with the fourth aspect. In the fifth aspect, the input device (100B) further includes a recovery member (50B) configured to transmit elastic force to the manipulation unit (10B) to move the manipulation unit (10B) from the second manipulation position to the first manipulation position. According to the fifth aspect, handleability can be improved.

The input device (100C) of the sixth aspect includes: a manipulation unit (10C); a body (40C); and a detector (33C). The manipulation unit (10C) includes a handle (11C), allows rotation of the handle (11C) around a rotational axis (P10) and pressing of the handle (11C) along the rotational axis (P10). The manipulation unit (10C) is configured to output a first signal (S1C) according to the rotation of the handle (11C) and a second signal (S2C) according to the pressing of the handle (11C). The body (40C) holds the manipulation unit (10C) to allow it to move from a first manipulation position to a second manipulation position along an opposite direction from a direction of the pressing the handle (11C). The detector (33C) is configured to output a third signal (S3C) when the manipulation unit (10C) is in the second manipulation position. The sixth aspect can provide outputs according to various manipulation inputs and therefore realize various outputs. Thereby, the input device is capable of controlling multiple electronic devices.

The input device (100C) of the seventh aspect would be realized in combination with the sixth aspect. In the seventh aspect, the input device (100C) further includes a recovery member (50C) configured to transmit elastic force to the manipulation unit (10C) to move the manipulation unit (10C) from the second manipulation position to the first manipulation position. According to the seventh aspect, handling can be improved.

The input device (100D) of the eighth aspect includes: a manipulation unit (10D); substrate (34D); a tilting mechanism (70D); and a detector (33D). The manipulation unit (10D) includes a handle (11D) which is rotatable around a rotation axis (P10) and is pressed along the rotation axis (P10), and outputting a first signal (S1D) corresponding to rotation of the handle and a second signal (S2D) corresponding to pressing of the handle. The substrate (34D) has a surface to which the manipulation unit (10D) is attached. The tilting mechanism (70D) includes an cylindrical shaft (321D) fixed to the substrate (34D) and a bearing fixed to the body (40D), the shaft (321D) is perpendicular to the rotation axis (P10), the bearing (43D) rotatably supports the shaft (321D) around the shaft (321D), and the tilting mechanism allows the substrate (34D) to swing around the shaft (321D) between a first manipulation position and a second manipulation position. The detector (33D) is disposed on the surface of the substrate (34D) facing the body (40D), and outputting a third signal (S3D) when the substrate (34D) is in the second manipulation position. The eighth aspect can provide outputs according to various manipulation inputs and therefore realize various outputs. Thereby, the input device is capable of controlling multiple electronic devices.

The input device (100D) of the ninth aspect would be realized in combination with the eighth aspect. In the ninth aspect, the substrate (34D) moves from the second manipulation position to the first manipulation position by its own weight. In the ninth aspect, a restoring member such as an elastic member may not be required, and thus the manufacturing cost may be reduced and ease of use may be improved.

The input device (100A; 100B; 100C; 100D) of the tenth aspect would be realized in combination with any one of the first to ninth aspects. In the tenth aspect, the first signal (S1A; S1B; S1C; S1D) is a signal indicative of a rotation angle around the rotational axis (P10) of the handle (11A; 11B; 11C; 11D). Accordingly, the tenth aspect can apply to electronic devices requiring input of rotation angles.

DETAILED DESCRIPTION

Figure 1:
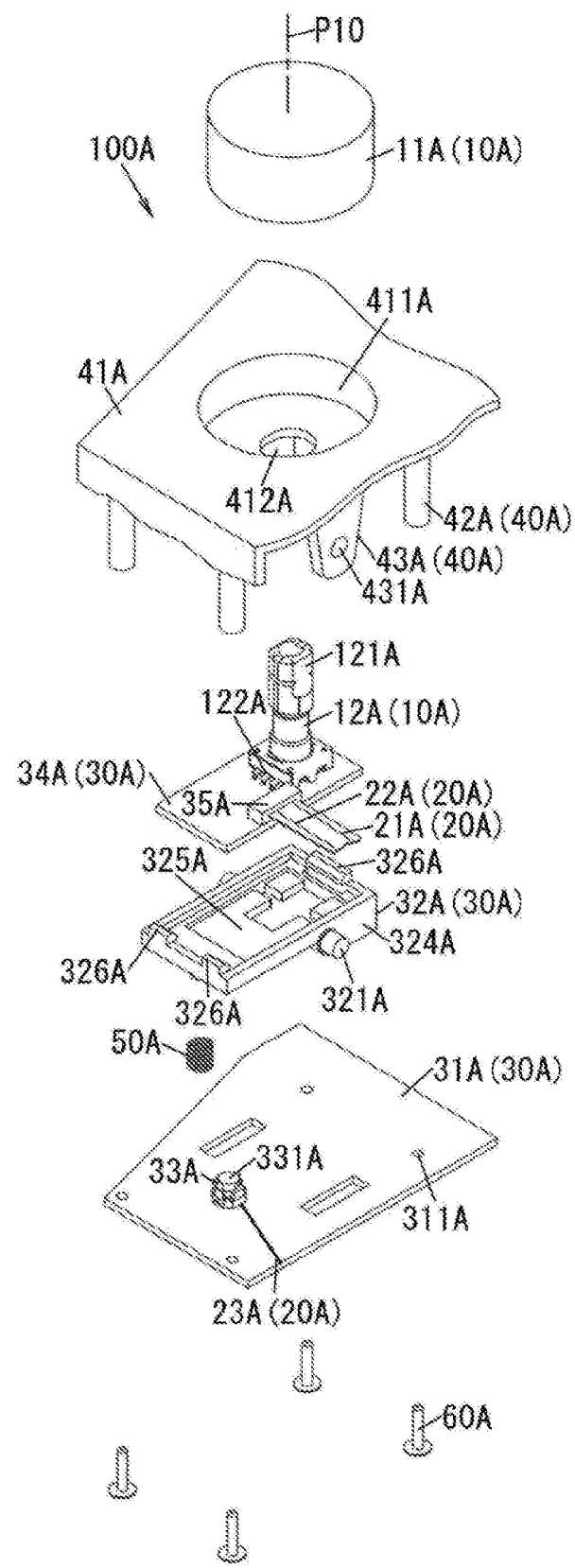
FIG. 1 is a top exploded perspective view of an input device of Embodiment 1.
Figure 2:
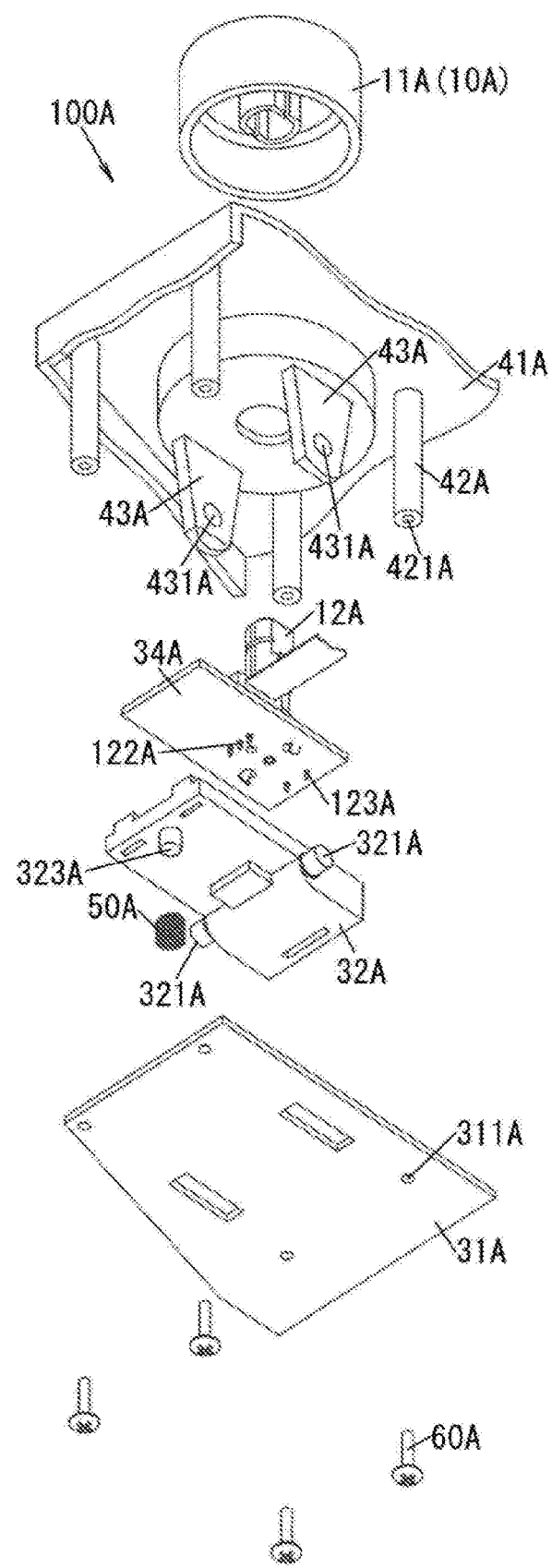
FIG. 2 is a bottom exploded perspective view of the input device of Embodiment 1.
Figure 3:
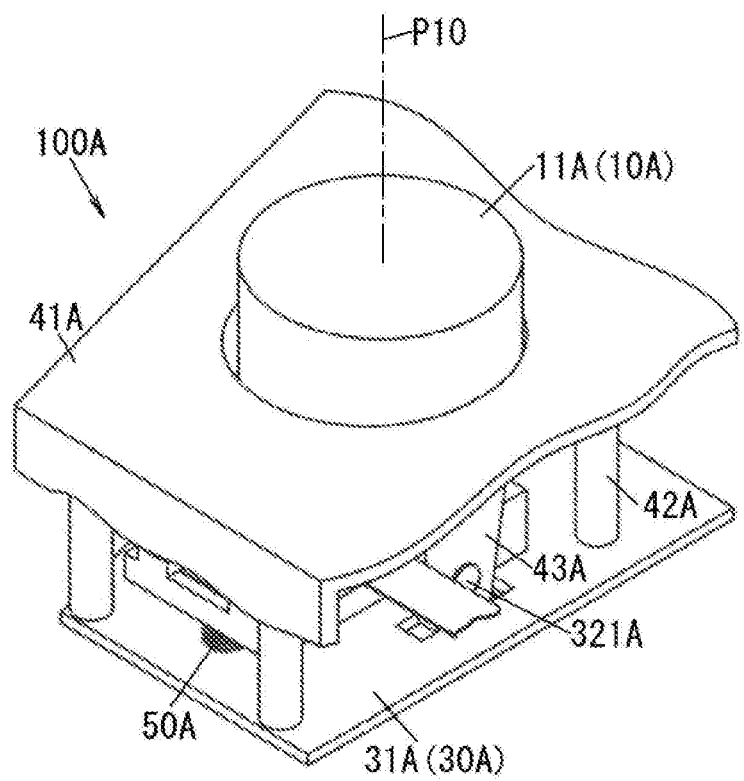
FIG. 3 is a perspective view of the input device of Embodiment 1.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Embodiment 1

[Input Device of Embodiment 1]

Hereinafter, an input device 100A of the present embodiment is described with reference to FIGS. 1-8. Note that, each of FIG. 4 to FIG. 7 shows the input device 100A with its forward and rearward directions corresponding to an upward and downward direction shown in the illustration. However, there is no intent to limit how to use the input device 100A.

Figure 4:
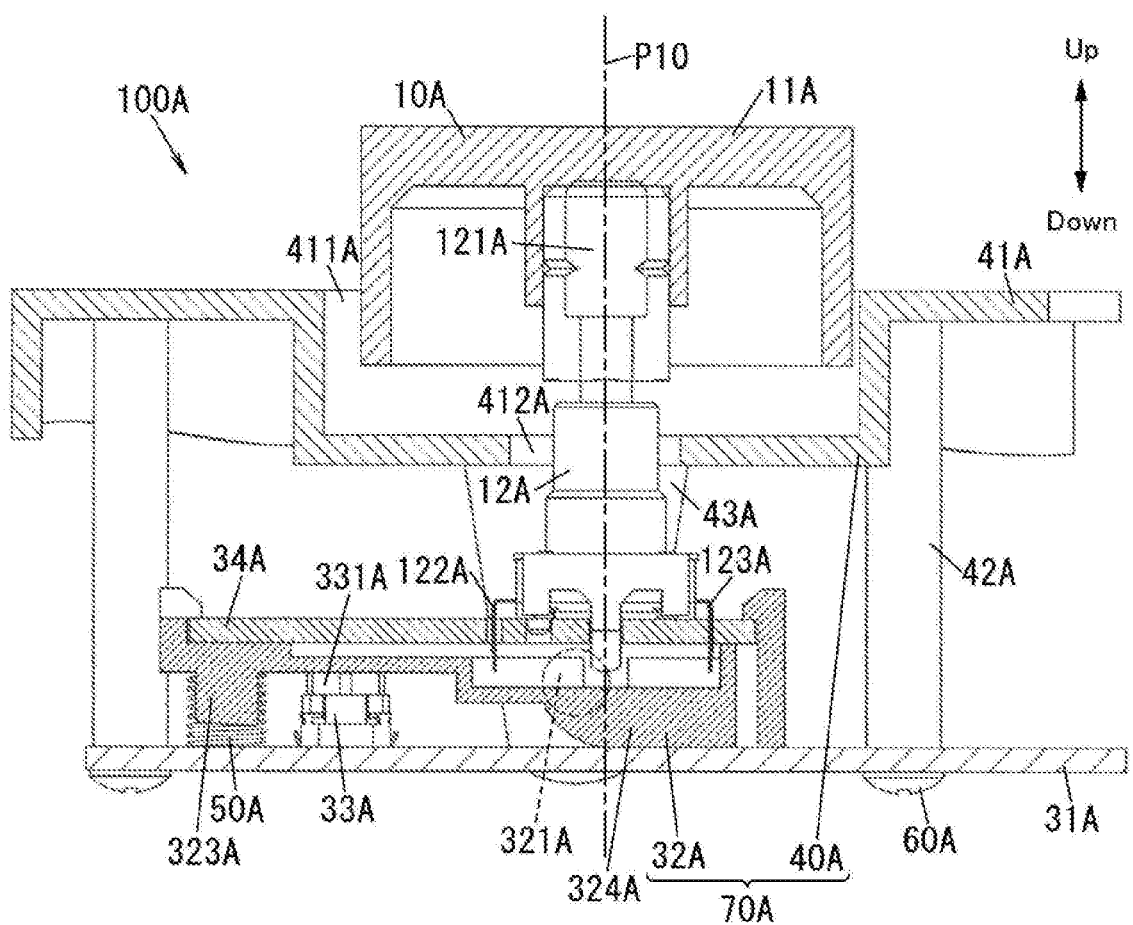
FIG. 4 is a section of the input device of Embodiment 1.

FIG. 4 shows the input device 100A, which includes a manipulation unit 10A, a first substrate 34A, a second substrate 31A, a tilting mechanism 70A, and a detector 33A. The manipulation unit 10A includes a handle (rotating part) 11A, allows rotation of the handle 11A around a rotational axis P10 and pressing of the handle 11A along the rotational axis P10, and is configured to output a first signal S1A (see FIG. 8) according to the rotation of the handle 11A and a second signal S2A (see FIG. 8) according to the pressing of the handle 11A. The manipulation unit 10A is attached to a surface (in FIG. 4, the upper surface) of the first substrate 34A. The second substrate 31A is on an opposite side (in FIG. 4, the lower side) of the first substrate 34A from the manipulation unit 10A. The tilting mechanism 70A includes a shaft 321A in a circular cylindrical shape fixed to the first substrate 34A perpendicularly to the rotational axis P10 and a bearing 43A fixed to the second substrate 31A to support rotatably the shaft 321A along a circumference of the shaft 321A. The tilting mechanism 70A allows the first substrate 34A to swing around the shaft 321A between a first manipulation position (see FIG. 4) and a second manipulation position (FIG. 7) relative to the second substrate 31A. The detector 33A is mounted on a surface (in FIG. 4, the upper surface) facing the first substrate 34A, of the second substrate 31A, and configured to output a third signal S3A (see FIG. 8) when the first substrate 34A is in the second manipulation position.

According to the input device 100A, rotating the handle 11A causes the manipulation unit 10A to output the first signal S1A. Pressing the handle 11A causes the manipulation unit 10A to output the second signal S2A. Additionally, tilting the handle 11A to move the first substrate 34A from the first manipulation position to the second manipulation position causes the detector 33A to output the third signal S3A. In summary, the input device 100A detects three actions which are rotating, pressing, and tilting of the handle 11A, and then outputs output signals (the first to third signals S1A to S3A) respectively corresponding to the actions. Therefore, various forms of inputs can be realized by use of one manipulation unit 10A. Thereby, the input device 100A is capable of controlling multiple electronic devices.

Hereinafter, detailed descriptions of the input device 100A are given.

Figure 8:
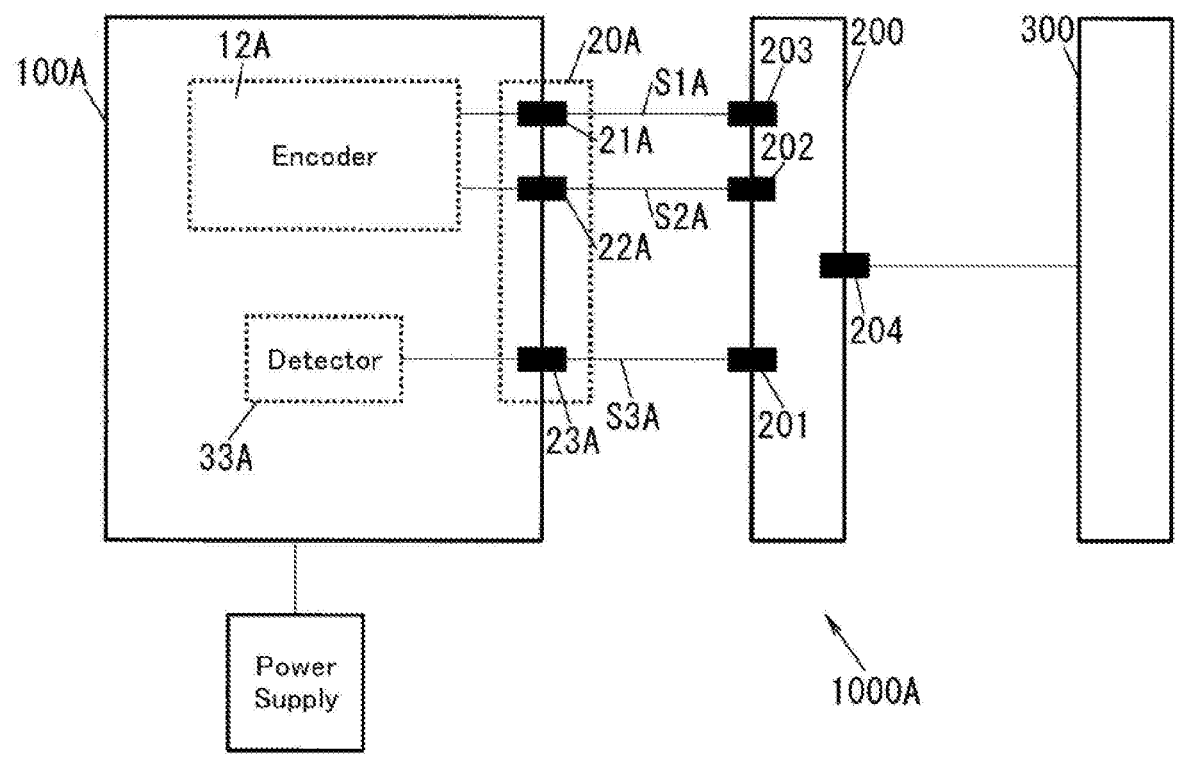
FIG. 8 is a schematic diagram of an electronic device including the input device of Embodiment 1.
Figure 9:
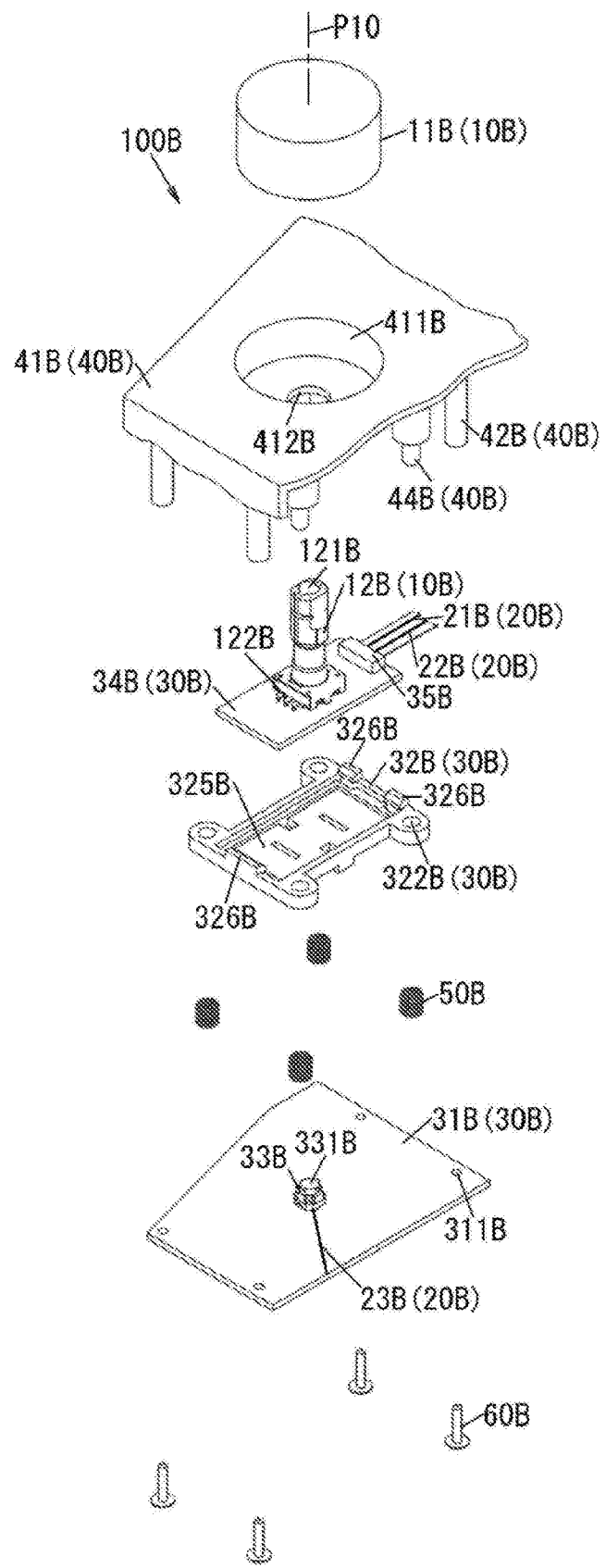
FIG. 9 is a top exploded perspective view of an input device of Embodiment 2.
Figure 10:
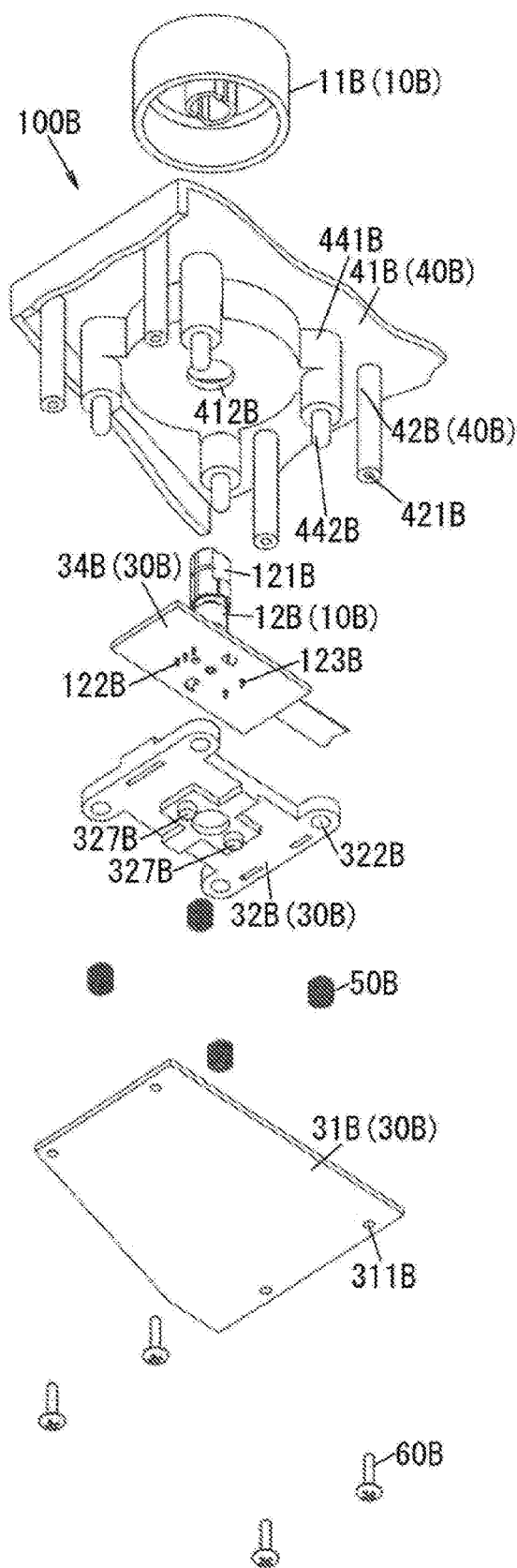
FIG. 10 is a bottom exploded perspective view of the input device of Embodiment 2.
Figure 11:
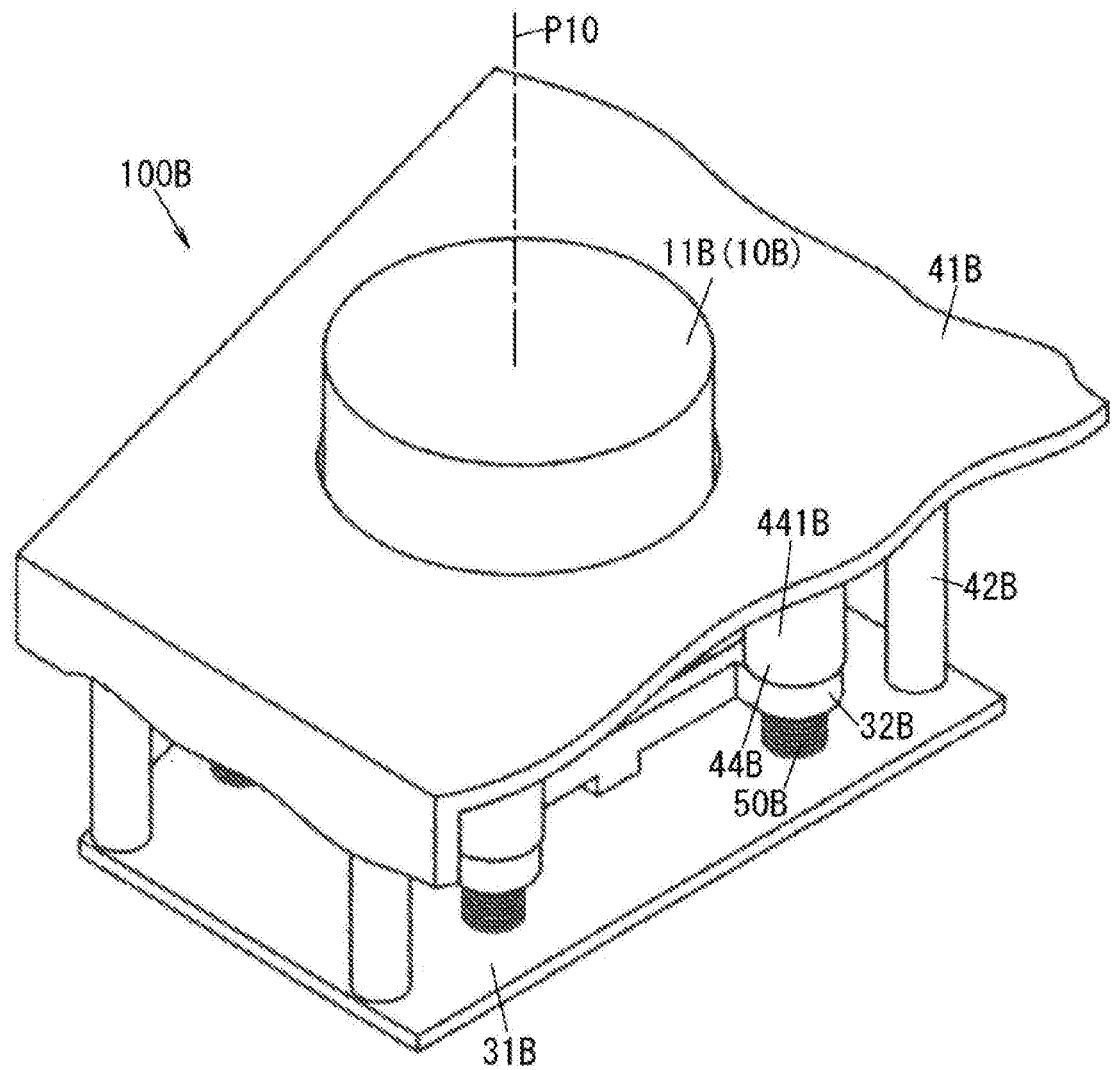
FIG. 11 is a perspective view of the input device of Embodiment 2.

The input device 100A includes the manipulation unit 10A (see FIG. 3) and an output unit 20A (see FIG. 8). The manipulation unit 10A (the handle 11A) is provided to be allowed to rotate, move along the rotational axis P10, and move along an axial direction perpendicular to the rotational axis P10.

The output unit 20A outputs, in response to rotation of the manipulation unit 10A, the first signal S1A corresponding to rotational directions of the manipulation unit 10A. Further, the output unit 20A outputs the second signal S2A in response to movement of the manipulation unit 10A along the rotational axis P10. Additionally, the output unit 20A outputs, in response to movement of the manipulation unit 10A in the axial direction, the third signal S3A corresponding to movement in the axial direction of the manipulation unit 10A.

The input device 100A is configured as described above. The input device 100A includes the manipulation unit 10A which is movable in various ways (rotation, movement in a direction of the rotational axis P10, and movement in a direction perpendicular to the rotational axis P10), and the output unit 20A to output signals (the first signal S1A, the second signal S2A, and the third signal S3A) corresponding to individual movements of the manipulation unit 10A.

Therefore, the input device 100A can provide various forms of inputs.

The input device 100A includes a basement unit 30A mechanically coupled to the manipulation unit 10A, in addition to the manipulation unit 10A and the output unit 20A which are described above (see FIG. 1). Further, the input device 100A includes a casing 40A.

As shown in FIG. 4, the manipulation unit 10A includes the handle 11A and an encoder 12A exemplifying a rotating manipulation electronic part. The handle 11A is a part used by a user to manually operate the input device 100A. The handle 11A is a rotating part coupled to the encoder 12A in a rotatable manner. Especially, the handle 11A has a circular cylindrical shape with an open rear face. The encoder 12A is located between the handle 11A and the basement unit 30A. In addition, the encoder 12A is mechanically coupled to the handle 11A. Note that, the encoder 12A is mechanically coupled to the basement unit 30A as described below, too. Alternatively, the encoder 12A may be an absolute type or an increment type. As a further alternative, the encoder 12A may be replaced with a variable resistor classified into rotating manipulation electronic parts allowing pressing like the encoder 12A.

The encoder 12A includes a coupler (shaft) 121A, a first terminal 122A, and a second terminal 123A. The coupler 121A is coupled to the handle 11A. Further, the coupler 121A is interlocked with the handle 11A of the manipulation unit 10A so that the coupler 121A rotates in rotation directions of the handle 11A and moves toward the basement unit 30A. In particular, the encoder 12A has an almost circular cylindrical shape, and includes the coupler 121A at its first end, and the first and second terminals 122A and 123A at its second end. The coupler 121A is allowed to be rotated around the rotational axis P10 and pressed along the rotational axis P10. In addition, as shown in FIG. 4, the handle 11A is coupled to the coupler 121A. Therefore, the handle 11A is allowed to be rotated around the rotational axis P10 and pressed along the rotational axis P10 together with the coupler 121A.

The first terminal 122A outputs the first signal S1A according to the rotational directions of the coupler 121A. In other words, the first signal S1A is a signal according to a degree of rotation of the handle 11A. For example, the first signal S1A has a signal level according to the rotation of the handle 11A. As one example, the first signal S1A is a signal indicative of a rotation angle around the rotational axis P10 of the handle 11A. The second terminal 123A outputs the second signal S2A according to movement of the coupler 121A toward the basement unit 30A. In other words, the second signal S2A is a signal according to pressing of the handle 11A. For example, the second signal S2A has a signal level according to a degree of the pressing of the handle 11A.

The encoder 12A is mounted on the surface (in FIG. 4, the upper surface) of the first substrate 34A, and thereby the first terminal 122A and the second terminal 123A of the encoder 12A are electrically connected to the first substrate 34A. Especially, the rotational axis P10 of the coupler 121A of the encoder 12A coincides with (or is aligned with) an axis oriented along a thickness direction of substrate 34A. By doing so, the manipulation unit 10A is attached to the surface (in FIG. 4, the upper surface) of the first substrate 34A. Further, there is a flexible printed circuit board (FPC) 35A mounted on the first substrate 34A. The FPC 35A is provided to send output from the encoder 12A to an outside of the input device 100A. The FPC 35A includes a first output part 21A and a second output part 22A.

The basement unit 30A includes the second substrate 31A, a movable member 32A, and the detector 33A. The second substrate 31A may be a circuit board or a printed board, including electronic circuits, for example.

The movable member 32A is supported on the second substrate 31A to allow tilting of the movable member 32A. In addition, the movable member 32A holds the encoder 12A. In particular, the movable member 32A holds the first substrate 34A, thereby holding the encoder 12A mounted on the first substrate 34A. The movable member 32A may have a fulcrum positioned between an effort point and a load point so that tilting in two opposite directions from its initial position is allowed, like a seesaw. Alternatively, to allow the movable member 32A to move in one direction from a reference position by prohibiting movement in the opposite direction from its initial position, the movable member 32A may have the load point positioned between the effort point and the fulcrum, or the effort point positioned between the load point and the fulcrum. Alternatively, the movable member 32A may include a plate such as a flat plate, and protrusions under the plate, so that the movable member 32A can tilt in four or eight directions, for example. In this case, the protrusions may preferably have a protruded shape with a surface curving outward.

When the movable member 32A is formed to move like a seesaw, it is preferable that an axis of a fulcrum of seesaw movement and the rotational axis P10 of the handle 11A or the coupler 121A do not intersect at right angles (or do not lie across each other). In other words, the axis of the fulcrum of seesaw movement and the rotational axis P10 are skew. Thereby, it is possible to suppress effects on the movable member 32A due to pressing (movement along the rotational axis P10) of the coupler 121A. Alternatively, when the movable member 32A is allowed to move in one direction from its initial position, the encoder 12A may be positioned at an opposite side from the fulcrum from a tilting side. Thereby, the movable member 32A may stably move.

In particular, the movable member 32A includes a pair of shafts 321A, a protrusion 323A, and a support 324A. The movable member 32A has a rectangular plate shape. The pair of shafts 321A extends in directions perpendicular to the rotational axis P10 of the handle 11A. As shown in FIG. 1, the pair of shafts 321A protrude from opposite sides in an axis oriented along width direction of the movable member 32A, and have the same central axis. Further, as understood from FIG. 1 and FIG. 2, the shafts 321A are received in a portion of the handle 11A that projects onto the second substrate 31A. The first substrate 34A is attached to a first surface of the movable member 32A in an axis oriented along a thickness direction of the movable member 32A. As shown in FIG. 1, the movable member 32A has at its first surface a recess 325A for accommodating the first substrate 34A and multiple claws 326A for keeping the first substrate 34A inside the recess 325A. The protrusion 323A and the support 324A protrude from a second surface in an axis oriented along a thickness direction of the movable member 32A. The protrusion 323A is at one end (in FIG. 4, the left end) in a longitudinal axis of the movable member 32A, and the support 324A is at the other end (in FIG. 4, the right end) in the longitudinal axis of the movable member 32A. The protrusion 323A is used to fix the elastic member 50A. The elastic member 50A serves as a recovery member configured to transmit elastic force to the first substrate 34A to move the first substrate 34A from the second manipulation position to the first manipulation position. In particular, the elastic member 50A is a coil spring and the protrusion 323A is inserted into an inside of the elastic member 50A. The support 324A serves as part to be supported on the second substrate 31A, of the movable member 32A. A surface of the support 324A directed to a center of the movable member 32A is a curved surface. Accordingly, the movable member 32A is allowed to swing on the second substrate 31A.

The detector 33A is positioned to be pressed by the movable member 32A. The detector 33A outputs the third signal S3A according to movement in a tilting direction of the movable member 32A. Examples of the detector 33A may include a push switch, a membrane switch, and a pressure sensor. When pressed by the movable member 32A, the detector 33A detects tilting of the movable member 32A. In the present embodiment, the detector 33A includes a manipulation part 331A. When the manipulation part 331A is pressed, the detector 33A outputs the third signal S3A.

In one example, the detector 33A may be located on the second substrate 31A, and may be pressed by the movable member 32A when the movable member 32A moves downward. In another example, the detector 33A may be located on a top portion 41A of the casing 40A described later, and may be pressed by the movable member 32A when the movable member 32A moves upwardly.

The casing 40A includes the top portion 41A and pillar parts 42A, and is formed with through holes 431A allowing insertion of the shafts 321A of the movable member 32A. The top portion 41A includes a recess 411A for accommodating the handle 11A. Each of the pillar parts 42A includes an upper end coupled with the top portion 41A and a lower end coupled with the second substrate 31A serving as a bottom by a fixing 60A. In the present embodiment, the fixings 60A are screws. In particular, a through hole 412A for allowing the encoder 12A to pass is formed in a bottom of the recess 411A (see FIG. 4). Further, the casing 40A includes four pillar parts 42A and the four pillar parts 42A are located on a bottom surface of the top portion 41A to surround the recess 411A. Each of the pillar parts 42A includes a screw hole 421A at its top end. By inserting the fixings 60A into the screw holes 421A of the pillar parts 42A via through holes 311A of the second substrate 31A, the casing 40A is fixed to the second substrate 31A.

Further, the casing 40A includes a pair of bearings 43A as structure for supporting the movable member 32A to allow swinging thereof. The pair of bearings 43A are provided to the bottom surface of the top portion 41A to be on opposite sides of the through hole 412A. Each of the pair of bearings 43A includes the through holes 431A. The pair of shafts 321A of the movable member 32A are individually fitted into the through holes 431A of the pair of bearings 43A, and thus the movable member 32A is allowed to swing around the shaft 321A relative to the casing 40A. Attached to the movable member 32A is the first substrate 34A where the manipulation unit 10A is mounted. Therefore, the casing 40A and the movable member 32A constitute the tilting mechanism 70A which allows the first substrate 34A to swing around the shaft 321A between the first manipulation position (see FIG. 4) and the second manipulation position (see FIG. 7) relative to the second substrate 31A. The first manipulation position is a position where the rotational axis P10 of the coupler 121A of the encoder 12A coincides with (or is aligned with) an axis oriented along a thickness direction of the second substrate 31A, for example. The second manipulation position is a position where the protrusion 323A of the movable member 32A is in contact with the second substrate 31A, for example. Note that, as to the input device 100A, as shown in FIG. 4, the rotational axis P10 and the detector 33A are on the opposite sides of the shaft 321A while the first substrate 34A is in the first manipulation position.

As described above, the input device 100A includes: the manipulation unit 10A (the handle 11A) provided to be allowed to rotate, move along the rotational axis P10, and move along the axial direction perpendicular to the rotational axis P10; and the output unit 20A to output the first signal S1A corresponding to the rotational direction of the manipulation unit 10A (the handle 11A), the second signal S2A corresponding to movement of the manipulation unit 10A (the handle 11A) along the rotational axis P10, and the third signal S3A corresponding to movement of the manipulation unit 10A (the handle 11A) in the axial direction.

The input device 100A further includes the basement unit 30A mechanically coupled to the manipulation unit 10A. The manipulation unit 10A includes the rotating part (handle) 11A, and the rotating manipulation electronic part (encoder) 12A which is positioned between the rotating part 11A and the basement unit 30A and is mechanically coupled to the rotating part 11A. The rotating manipulation electronic part (encoder) 12A includes: the coupler 121A which is coupled to the rotating part 11A and is allowed to rotate in rotational directions and move toward the basement unit 30A; the first terminal 122A for outputting the first signal S1A corresponding to the rotational directions of the coupler 121A; and the second terminal 123A for outputting the second signal S2A corresponding to movement of the coupler 121A toward the basement unit 30A. The basement unit 30A includes: the second substrate 31A; the movable member 32A which is allowed to tilt on the second substrate 31A and holds the rotating manipulation electronic part (encoder) 12A; and the detector 33A which is located to be pressed by the movable member 32A and is configured to output the third signal S3A corresponding to movement in the tilting direction of the movable member 32A. The output unit 20A includes: the first output part 21A electrically connected to the first terminal 122A; the second output part 22A electrically connected to the second terminal 123A; and a third output part 23A electrically connected to a third terminal (detector) 33A.

The input device 100A is configured to as described above and operates as follows. Operations of the input device 100A are described with reference to FIG. 4 to FIG. 7.

FIG. 4 shows a state (initial state) where no load is applied to the input device 100A. In this state, the first substrate 34A is in the first manipulation position relative to the second substrate 31A. When the handle 11A is rotated (around the rotational axis P10) in this state, the first signal S1A is outputted from the first terminal 122A of the encoder 12A, and then the first signal S1A is outputted through the first output part 21A (see FIG. 8).

Figure 5:
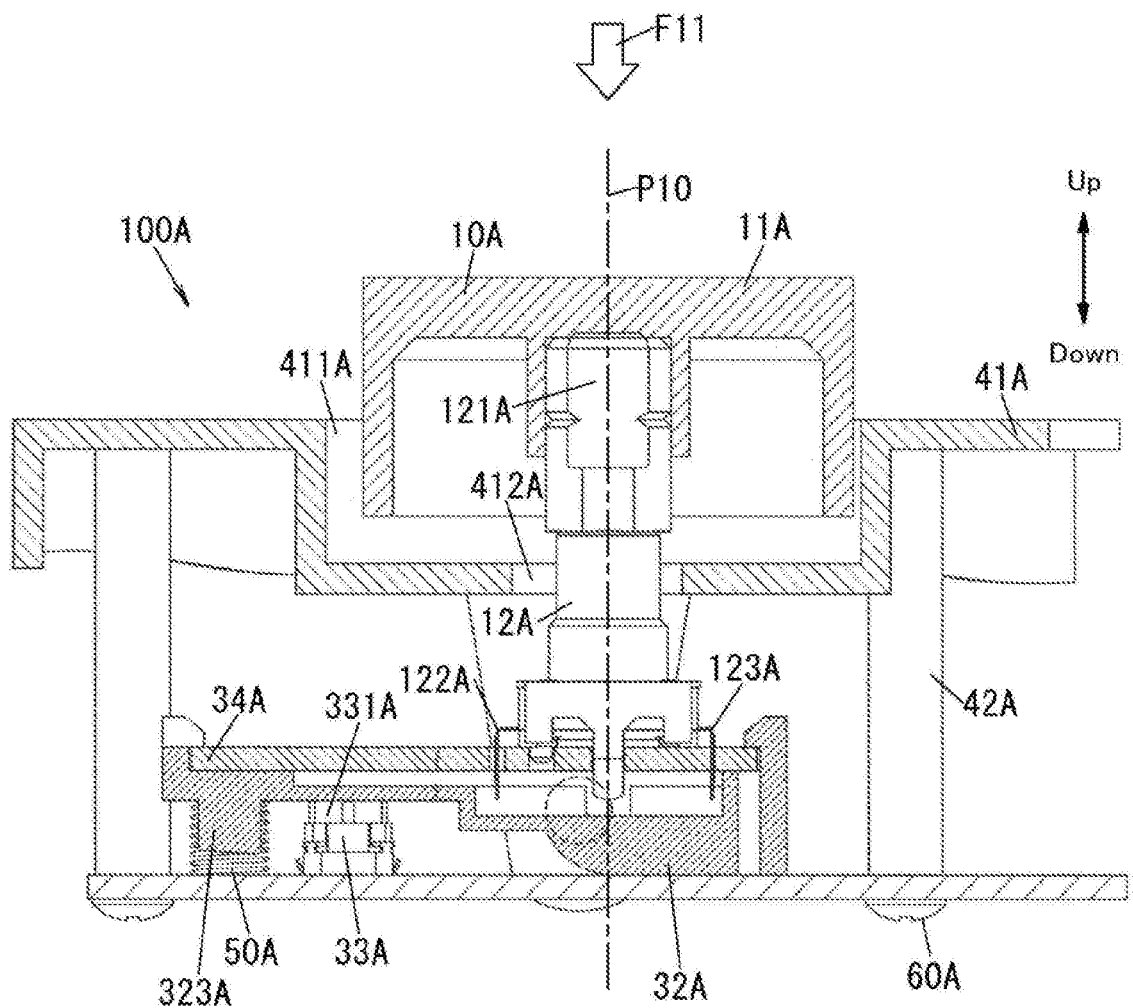
FIG. 5 is a section of the input device of Embodiment 1 in a pressed state.

FIG. 5 shows a state (pressed state) where a pressing force F11 is applied to the handle 11A of the input device 100A in a top-to-bottom direction. In this state, due to pressing of the handle 11A, the second signal S2A is outputted from the second terminal 123A of the encoder 12A, and then the second signal S2A is outputted through the second output part 22A (see FIG. 8).

Figure 6:
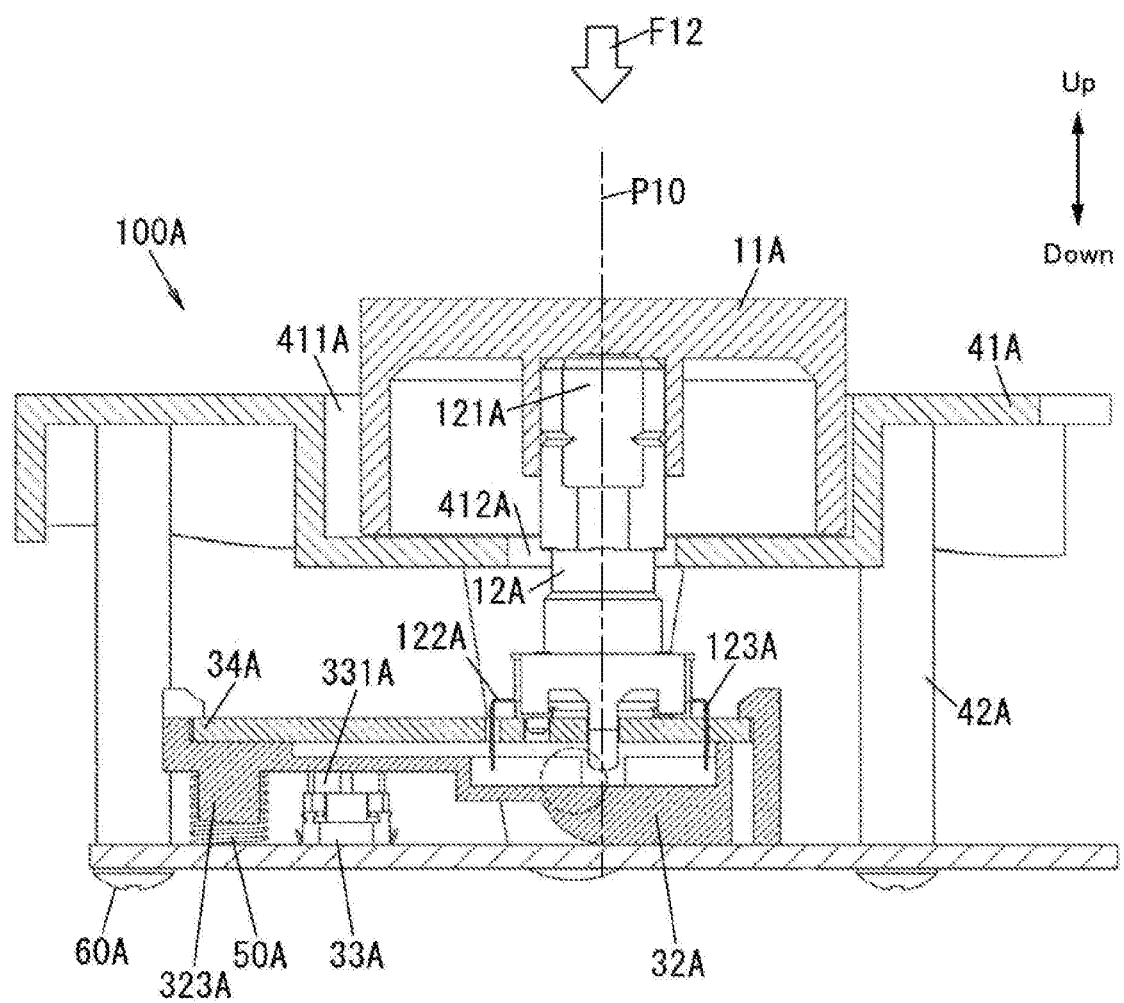
FIG. 6 is a section of the input device of Embodiment 1 in a more pressed state.

FIG. 6 shows a state (deeply pressed state) where larger pressing force F12 larger than the pressing force F11 in the pressed state shown in FIG. 5 is applied to the handle 11A of the input device 100A in the top-to bottom direction. In this state, the coupler 121A of the encoder 12A is inserted into a body of the encoder 12A and the handle 11A is further inserted into the recess 411A of the top portion 41A. When such a mechanism is employed, the encoder 12A serves as a cushion in case the handle 11A is pressed strongly. Therefore, it is possible to buffer mechanical force applied to a circuit board (the first substrate 34A) caused when the encoder 12A presses the circuit board (the first substrate 34A).

Figure 7:
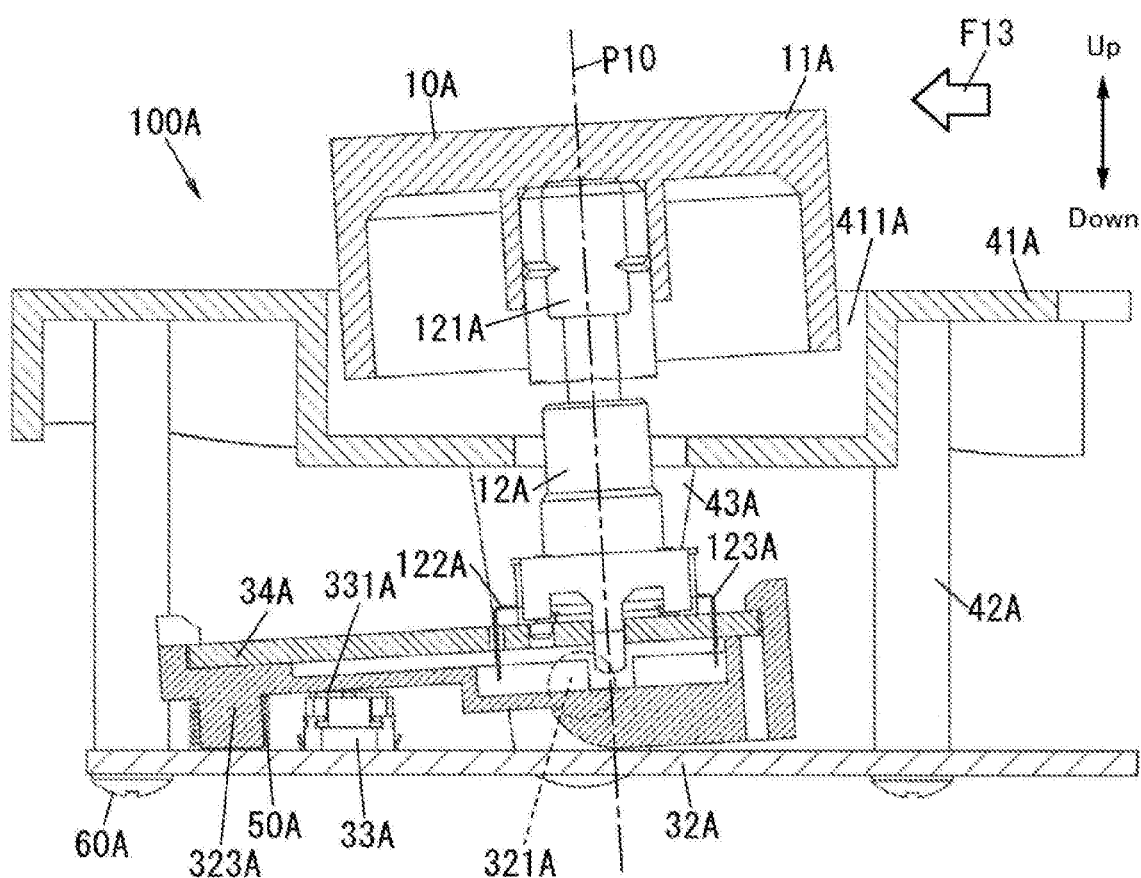
FIG. 7 is a section of the input device of Embodiment 1 in a tilted state.

FIG. 7 shows a state (tilted state) where force F13 is applied to the handle 11A in a direction (in FIG. 7, the left direction) perpendicular to the rotational axis P10 in the initial state. Accordingly, the movable member 32A (the first substrate 34A) swings about the shaft 321A and thus moves from the first manipulation position to the second manipulation position. In this state, the third signal S3A is outputted from the detector 33A, and then the third signal S3A is outputted through the third output part 23A. Note that, in FIG. 7, a pressed part of the movable member 32A moves downward, and therefore the detector 33A is pressed downward by the movable member 32A. However, an opposite part of the movable member 32A from the pressed part moves upward and therefore in an alternative case the detector 33A may be pressed upward by the movable member 32A. When the force for tilting is removed in this state, the elastic member 50A recovers the movable member 32A. In particular, due to the elastic member 50A, the movable member 32A (the first substrate 34A) returns from the second manipulation position to the first manipulation position.

The input device 100A operates as described above. The input device 100A detects three actions of rotation, pressing, and tilting of the handle 11A, and outputs output signals (S1A, S2A, S3A) individually corresponding to the three actions. Therefore, various forms of inputs can be given by use of one manipulation unit 10A.

[Electronic Device of Embodiment 1]

Hereinafter, the electronic device 1000A including the input device 100A of Embodiment 1 is described with reference to FIG. 8. Examples of the electronic device 1000A may include: input apparatus such as remote controllers; AV apparatus such as recorders, televisions, video players; lighting apparatus such as ceiling lights, indirect lights, and spot lights; appliances such as air conditioners, refrigerators, washing machines, and dryers; vehicles such as electric automobiles, gas-powered automobiles, hybrid automobiles, and motorcycles; and vehicular electronic apparatus such as car navigation systems, vehicular audio systems, vehicular televisions, and vehicular air conditioners.

The electronic device 1000A includes a micro control unit (MCU) 200 electrically connected to the input device 100A. The MCU 200 includes a first input terminal 203, a second input terminal 202, and a third input terminal 201. The first output part 21A, the second output part 22A, and the third output part 23A are electrically connected to the first input terminal 203, the second input terminal 202, and the third input terminal 201, respectively. Further, a path between the first output part 21A and the first input terminal 203, a path between the second output part 22A and the second input terminal 202, and a path between the third output part 23A and the third input terminal 201 are electrically independent from each other.

The MCU 200 determines which of the input terminals (the first to third input terminals 203, 202, and 201) receives an output signal (the first to third signals S1A, S2A, S3A) as input, and determines a degree of such input based on durations, voltage waveforms, or electric pulses.

Further, the MCU 200 is electrically connected to an object (load 300) to be adjusted or controlled in the aforementioned electronic device. Examples of the object may include display devices, motors, light sources, timers, and speakers. The MCU 200 controls such objects via a control terminal 204.

In the following, descriptions are made to an example where the input device 100A of Embodiment 1 is electrically connected to a vehicular audio system, a vehicular air conditioner, a vehicular light, and a vehicular television. Destination of output can be switched among the vehicular audio system, the vehicular air conditioner, the vehicular light, and the vehicular television by tilting. The destination of output may be switched to the vehicular audio system in response to left tilting. The destination of output may be switched to the vehicular air conditioner in response to right tilting. The destination of output may be switched to the vehicular light in response to forward tilting. The destination of output may be switched to the vehicular television in response to backward tilting. Alternatively, the destination of output may be switched each time left tilting action is made.

Optionally, when tilting does not continue for a predetermined period of time, the tilting may be ignored. In this case, when pressing or rotating is done within a predetermined period of time from tilting, it may be treated as input. Therefore, a user does not need to remember previous action. When the current destination of output is displayed on a monitor or the like, it is unnecessary for the user to check it each time input is given.

Alternatively, to display color vision information to announce the destination of output, the manipulation unit 10A (the handle 11A) may be transparent and a light source such as a light emitting diode a liquid crystal display, or an organic electroluminescence element may be placed inside the input device 100A.

For example, various parameters such as sound volume, temperatures, air volume, brightness, and color temperature can be adjusted according to rotating. In connection with rotating, the color of the manipulation unit 10A (the handle 11A) can be changed. For example, the color may be made to become more red (warm color) as the temperature on the air conditioner increases, and the color may be made to become more blue (cold color) as the temperature on the air conditioner decreases. For example, the color may be changed from white to black or green as the sound volume of the speaker increases.

For example, decision may be made when pressing. When pressing is not made within a predetermined period of time, the MCU 200 may determine that operation is canceled, and then return to the initial state.

As described above, since the electronic device 1000A includes the input device 100A of Embodiment 1, it can allow various forms of inputs by use of one manipulation unit 10A. This may lead to improvement of design, and improvement of handleability.

Embodiment 2

[Input Device of Embodiment 2]

Hereinafter, an input device 100B of the present embodiment is described with reference to FIG. 9 to FIG. 16. Note that, each of FIG. 12 to FIG. 15 shows the input device 100B with its forward and rearward directions corresponding to an upward and downward direction shown in the illustration. However, there is no intent to limit how to use the input device 100B.

Figure 12:
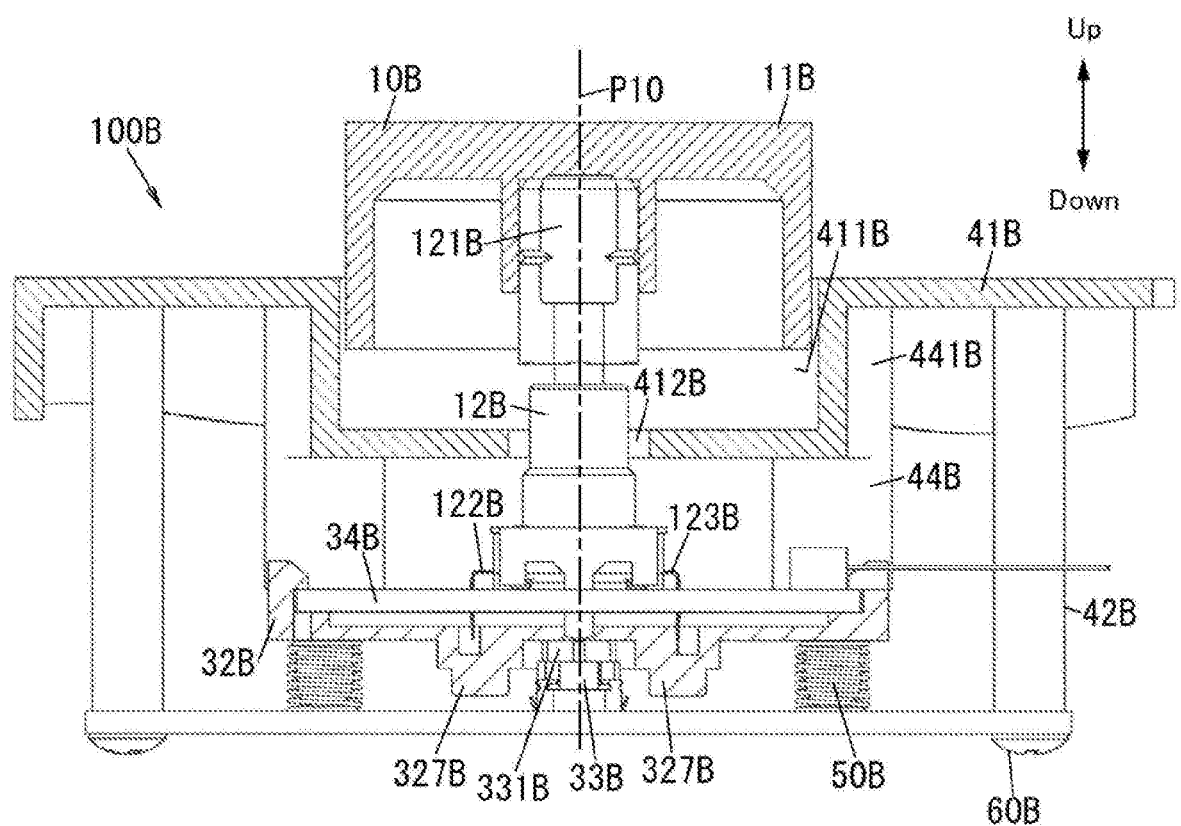
FIG. 12 is a section of the input device of Embodiment 2.

FIG. 12 shows the input device 100B, which includes a manipulation unit 10B, a body (casing) 40B, and the detector 33B. The manipulation unit 10B includes a handle (rotating part) 11B, allows rotation of the handle 11B around a rotational axis P10 and pressing of the handle 11B along the rotational axis P10, and is configured to output a first signal S1B (see FIG. 16) according to the rotation of the handle 11B and a second signal S2B (see FIG. 16) according to the pressing of the handle 11B. The body 40B holds the manipulation unit 10B to allow it to move from a first manipulation position (see FIG. 12) to a second manipulation position (see FIG. 15) along a direction of the pressing the handle 11B. The detector 33B is configured to output a third signal S3B (see FIG. 16) when the manipulation unit 10B is in the second manipulation position.

According to the input device 100B, rotating the handle 11B causes the manipulation unit 10B to output the first signal S1B. Pressing the handle 11B causes the manipulation unit 10B to output the second signal S2B. Further pressing the handle 11B to move the manipulation unit 10B from the first manipulation position to the second manipulation position causes the detector 33B to output the third signal S3B. In summary, the input device 100B detects three actions which are rotating, first level pressing (exerting continuous physical force), and second level pressing (exerting continuous physical force), of the handle 11B, and then outputs output signals (the first to third signals S1B to S3B) respectively corresponding to the actions. Therefore, various forms of inputs can be realized by use of one manipulation unit 10B. Thereby, the input device 100B is capable of controlling multiple electronic devices.

The present embodiment is similar to Embodiment 1 in that the detector 33B is located under the movable member 32B but is different from it in directions of movement of the movable member 32B. In particular, Embodiment 1 outputs the third signal S3A in response to tilting the movable member 32A, but Embodiment 2 outputs the third signal S3B in response to more pressing the handle 11B.

In other words, the present embodiment is modified from Embodiment 1 in order to realize various forms of inputs by rotating, the first level pressing, and the second level pressing, of the manipulation unit 10B (the handle 11B).

The movable member 32B is supported by four elastic members 50B, and the detector 33B is located in a position facing a central part of the movable member 32B. Note that, when the detector 33B is placed on a line interconnecting two elastic members 50B, the number of elastic members 50B may be two. When the elastic member 50B is a coil spring, the detector 33B may be placed inside the coil spring. When the detector 33B is a push switch including an elastically movable contact, the elastic members 50B can be omitted. Note that, when multiple elastic members 50B are used, elastic coefficients and spring constants thereof may preferably fall within ranges to an extent that the movable member 32B can be balanced. Thereby, balance of movement of the movable member 32B can be kept.

To move the movable member 32B in upward and downward directions, the casing 40B is formed to include guides 44B and the movable member 32B is formed to include through holes 322B allowing insertion of the guides 44B.

Hereinafter, detailed descriptions of the input device 100B are given.

Figure 16:
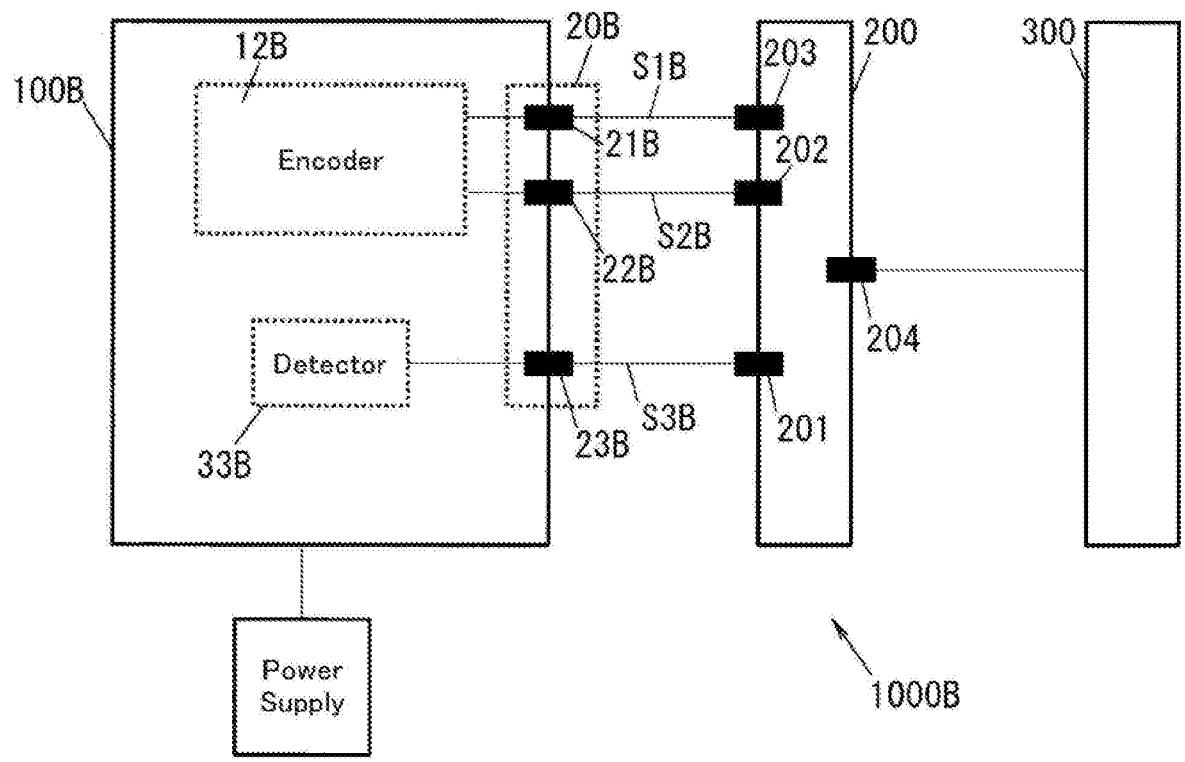
FIG. 16 is a schematic diagram of an electronic device including the input device of Embodiment 2.
Figure 17:
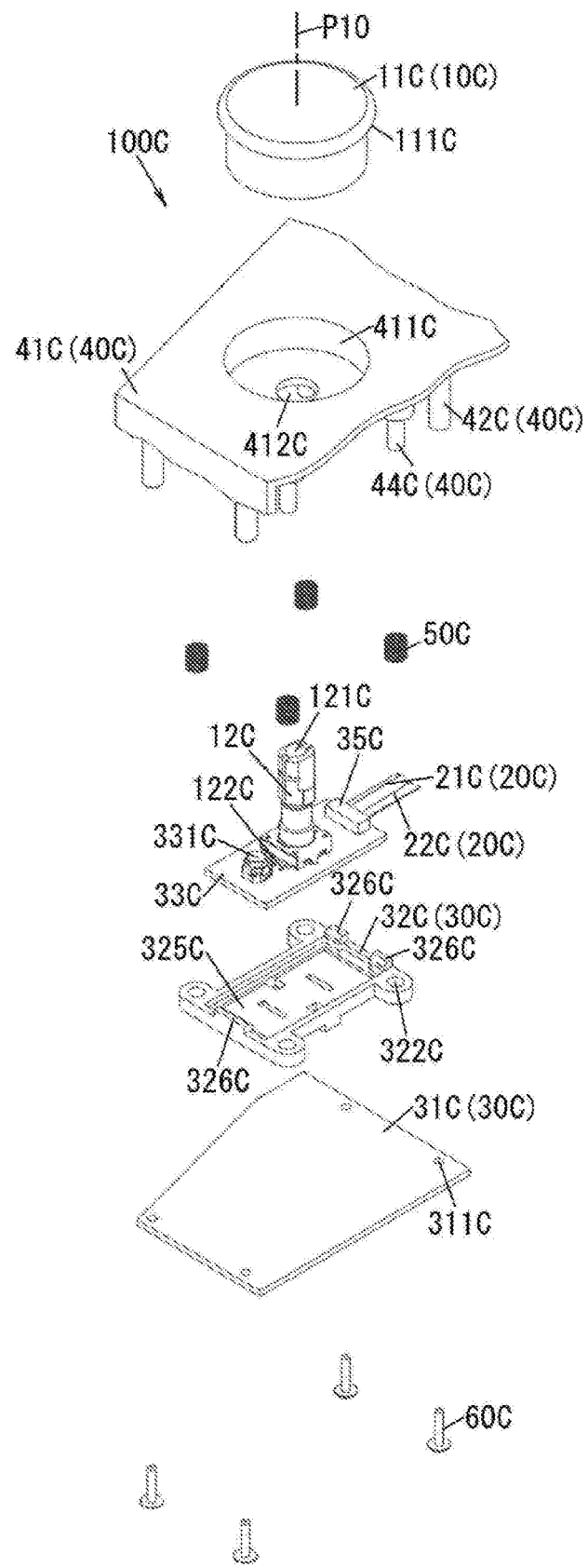
FIG. 17 is a top exploded perspective view of the input device of Embodiment 3.
Figure 18:
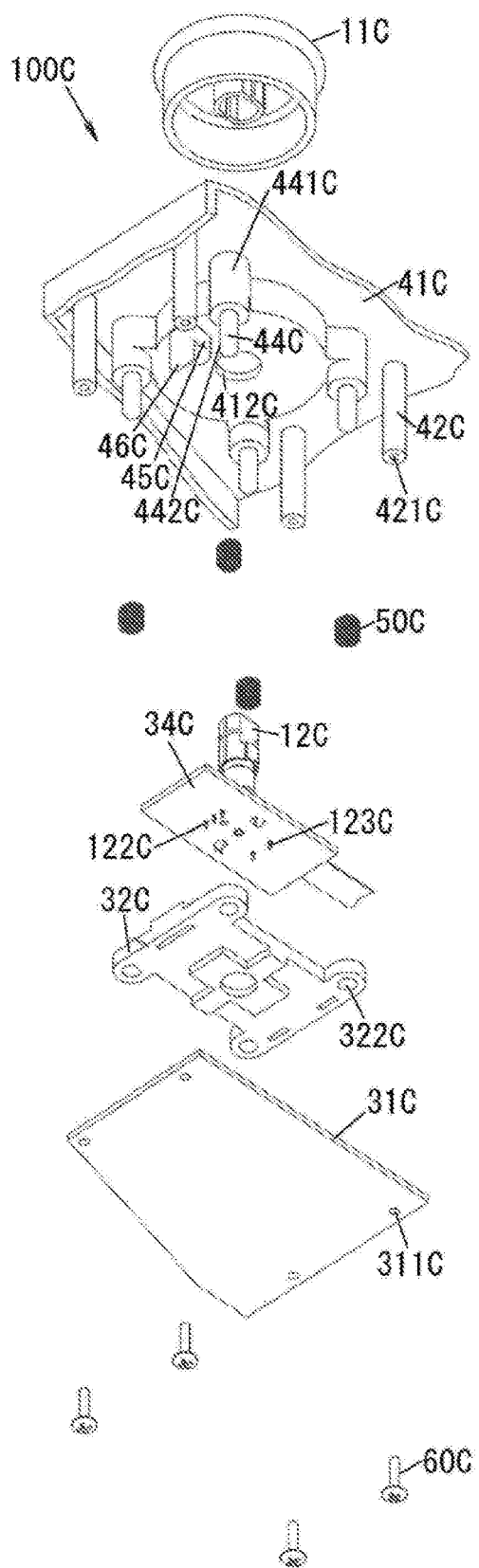
FIG. 18 is a bottom exploded perspective view of an input device of Embodiment 3.
Figure 19:
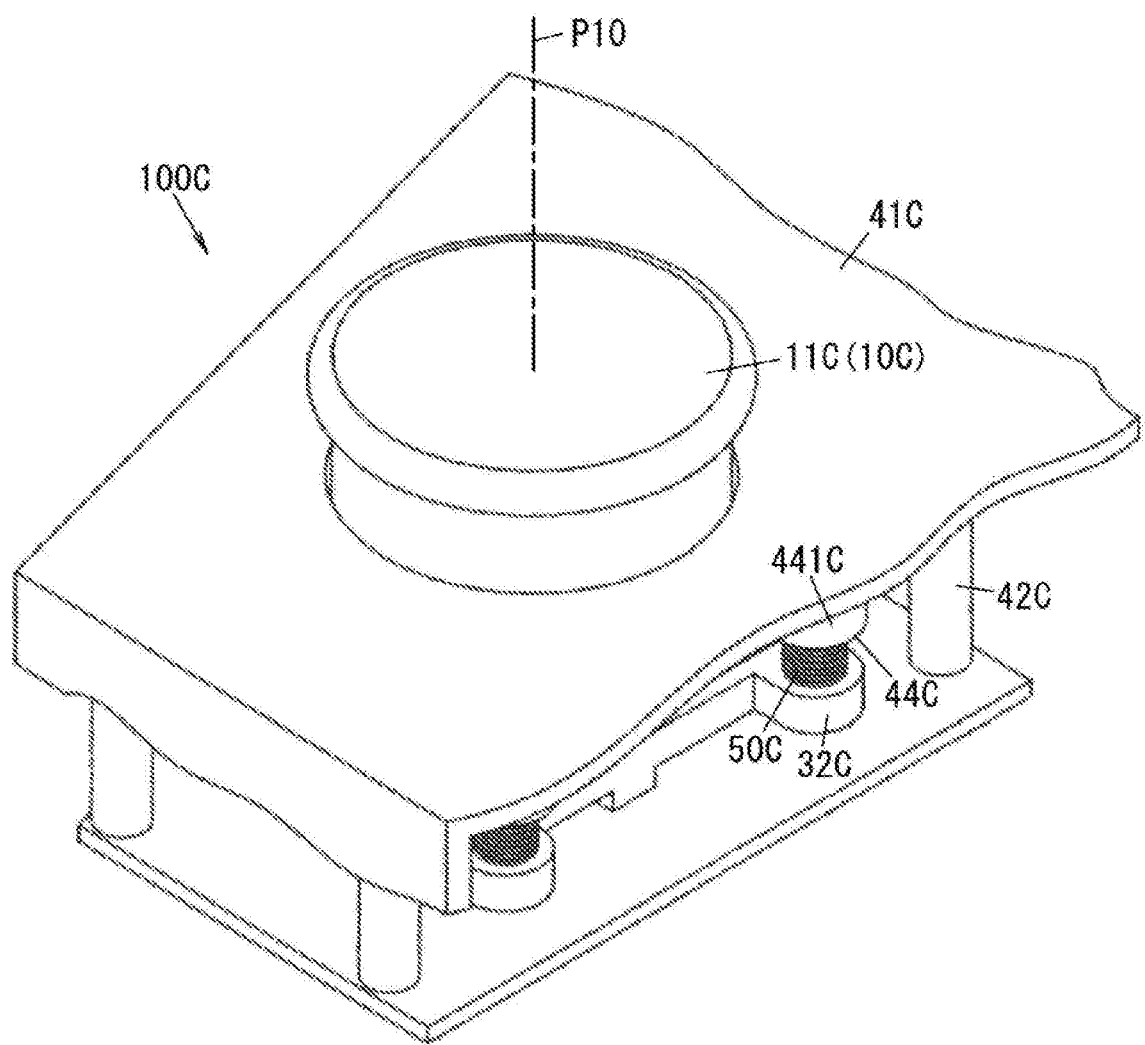
FIG. 19 is a perspective view of the input device of Embodiment 3.

The input device 100B includes the manipulation unit 10B (see FIG. 11) and an output unit 20B (see FIG. 16). The manipulation unit 10B (the handle 11B) is provided to be allowed to rotate and move along the rotational axis P10.

The output unit 20B outputs, in response to rotation of the manipulation unit 10B, the first signal S1B corresponding to rotational directions of the manipulation unit 10B. Further, the output unit 20B outputs the second signal S2B in response to movement of the manipulation unit 10B along the rotational axis P10. Additionally, the output unit 20B outputs the third signal S3B in response to additional movement of the manipulation unit 10B along the rotational axis P10. In particular, as shown in FIG. 16, the output unit 20B includes a first output part 21B for outputting the first signal S1B, a second output part 22B for outputting the second signal S2B, and a third output part 23B for outputting the third signal S3B.

As described above, the input device 100B includes: the manipulation unit 10B (the handle 11B) which is provided to be allowed to rotate and move between a first position and a second position along the rotational axis P10; the first output part 21B for outputting the first signal S1B corresponding to rotational directions of the manipulation unit 10B; the second output part 22B for outputting the second signal S2B corresponding to the first position; and the third output part 23B for outputting the third signal S3B corresponding to the second position. In this regard, the first position is a position to which the handle 11B is moved from its initial position by pressing it. The second position is a position to which the handle 11B is moved from the first position by pressing it.

The input device 100B includes a basement unit 30B mechanically coupled to the manipulation unit 10B, in addition to the manipulation unit 10B and the output unit 20B which are described above (see FIG. 9). Further, the input device 100B includes the casing 40B.

The manipulation unit 10B includes the handle 11B and an encoder 12B. The handle 11B and the encoder 12B are the same as the handle 11A and the encoder 12A of Embodiment 1. The encoder 12B includes a coupler (shaft) 121B, a first terminal 122B, and a second terminal 123B. The coupler 121B is coupled to the handle 11B. Further, the coupler 121B is cooperated with the handle 11B of the manipulation unit 10B so that the coupler 121B rotates in rotation directions of the handle 11B and moves toward the basement unit 30B. Therefore, the handle 11B is allowed to be rotated around the rotational axis P10 and pressed along the rotational axis P10 together with the coupler 121B.

The first terminal 122B outputs the first signal S1B according to the rotational directions of the coupler 121B. As one example, the first signal S1B is a signal indicative of a rotation angle around the rotational axis P10 of the handle 11B. The second terminal 123B outputs the second signal S2B according to movement of the coupler 121B toward the basement unit 30B.

The encoder 12B is mounted on a surface (in FIG. 12, the upper surface) of a first substrate 34B, and thereby the first terminal 122B and the second terminal 123B of the encoder 12B are electrically connected to the first substrate 34B. Especially, the rotational axis P10 of the coupler 121B of the encoder 12B coincides with (or is aligned with) an axis oriented along a thickness direction of first substrate 34B. By doing so, the manipulation unit 10B is attached to the surface (in FIG. 12, the upper surface) of the first substrate 34B. Further, there is a flexible printed circuit board (FPC) 35B mounted on the first substrate 34B. The FPC 35B is provided to send output from the encoder 12B to an outside of the input device 100B. The FPC 35B includes the first output part 21B and the second output part 22B.

The basement unit 30B includes a second substrate 31B, the movable member 32B, and the detector 33B. The second substrate 31B may be a circuit board or a printed board, including electronic circuits, for example.

The movable member 32B is provided to move along the rotational axis P10 relative to the second substrate 31B. In addition, the movable member 32B holds the encoder 12B. In particular, the movable member 32B holds the first substrate 34B, thereby holding the encoder 12B mounted on the first substrate 34B. The movable member 32B has a rectangular plate shape. The first substrate 34B is attached to a first surface of the movable member 32B in an axis oriented along a thickness direction of the movable member 32B. Especially, the movable member 32B has at its first surface a recess 325B for accommodating the first substrate 34B and multiple claws 326B for keeping the first substrate 34B inside the recess 325B. Further, the movable member 32B includes at its four corners the through holes 322B for attaching the movable member 32B to the casing 40B so that the movable member 32B is movable along the rotational axis P10. Additionally, the movable member 32B has its second surface in an axis oriented along a thickness direction of a pair of stoppers 327B (see FIG. 10). The pair of stoppers 327B are positioned on opposite sides in a longitudinal axis of the movable member 32B with regard to a center of the second surface of the movable member 32B.

The detector 33B is positioned to be pressed by the movable member 32B. The detector 33B outputs the third signal S3B according to movement of the movable member 32B along the rotational axis P10. Examples of the detector 33B may include a push switch, a membrane switch, and a pressure sensor. When pressed by the movable member 32B, the detector 33B detects pressing of the movable member 32B. In the present embodiment, the detector 33B includes a manipulation part 331B. When the manipulation part 331B is pressed, the detector 33B outputs the third signal S3B. As shown in FIG. 12, the detector 33B is located on the second substrate 31B. In particular, the detector 33B is mounted on the second substrate 31B to be positioned on the rotational axis P10.

The casing 40B includes a top portion 41B and pillar parts 42B. The top portion 41B includes a recess 411B for accommodating the handle 11B. Each of the pillar parts 42B includes an upper end coupled with the top portion 41B and a lower end coupled with the second substrate 31B serving as a bottom by a fixing 60B. In the present embodiment, the fixings 60B are screws. In particular, a through hole 412B for allowing the encoder 12B to pass is formed in a bottom of the recess 411B (see FIG. 12). Further, the casing 40B includes four pillar parts 42B and the four pillar parts 42B are located on a bottom surface of the top portion 41B to surround the recess 411B. Each of the pillar parts 42B includes a screw hole 421B at its top end. By inserting the fixings 60B into the screw holes 421B of the pillar parts 42B via through holes 311B of the second substrate 31B, the casing 40B is fixed to the second substrate 31B.

Further, the casing 40B includes multiple (four in the illustrated example) guides 44B as structure for supporting the movable member 32B to allow it to move in a direction (in FIG. 12, the upward and downward directions) along the rotational axis P10. The multiple guides 44B are located on the bottom surface of the top portion 41B to surround the recess 411B. Each of the guides 44B includes a pedestal 441B with a pillar shape protruding from the bottom surface of the top portion 41B and a leg 442B protruding from a top end of the pedestal 441B. The leg 442B is of a size to pass through the through hole 322B of the movable member 32B. In contrast, the pedestal 441B is of a size not to pass through the through hole 322B. In addition, the legs 442B are longer than the through holes 322B. Further, the legs 442B are formed to have their axial directions parallel to the rotational axis P10.

The movable member 32B is attached to the casing 40B by inserting the legs 442B of the guides 44B into the through holes 322B. Therefore, the movable member 32B is movable along the axial directions of the legs 442B of the guides 44B, which correspond to the rotational axis P10. Further, the casing 40B is fixed to the second substrate 31B. In this regard, the multiple elastic members 50B are disposed between the movable member 32B and the second substrate 31B. In particular, the elastic members 50B are engaged with parts of the legs 442B of the guides 44B which protrude outside from the through holes 322B of the movable member 32B. Note that, as shown in FIG. 12, the leg 442B of each of the guides 44B is in contact with the second substrate 31B while the casing 40B is fixed to the second substrate 31B.

As described above, the casing (body) 40B holds the movable member 32B to allow it to move in the direction (in FIG. 12, the upward and downward directions) along the rotational axis P10. The movable member 32B holds the manipulation unit 10B and the direction of pressing the handle 11B of the manipulation unit 10B corresponds to a direction along the rotational axis P10. Accordingly, the casing 40B holds the manipulation unit 10B to allow it to move from the first manipulation position to the second manipulation position along the direction of pressing the handle 11B. The first manipulation position is a position where the movable member 32B is closer to the casing 40B than in the second manipulation position. As described above, disposed between the movable member 32B and the second substrate 31B are the multiple elastic members 50B. These elastic members 50B each serve as a recovery member configured to transmit elastic force to the manipulation unit 10B to move the manipulation unit 10B from the second manipulation position to the first manipulation position. In this regard, the pedestals 441B of the guides 44B are larger than the through holes 322B of the movable member 32B and therefore the movable member 32B is positioned by the pedestals 441B. Accordingly, in the first manipulation position, the movable member 32B is in contact with the pedestals 441B of the guides 44B (see FIG. 12). Further, in the second manipulation position, the pair of stoppers 327B of the movable member 32B is in contact with the surface facing the first substrate 34B, of the second substrate 31B (see FIG. 15).

The input device 100B is configured to as described above and operates as follows. Operations of the input device 100B are described with reference to FIG. 12 to FIG. 15.

FIG. 12 shows a state (initial state) where no load is applied to the input device 100B. In this state, the manipulation unit 10B is in the first manipulation position. In the state of FIG. 12, a user is assumed to rotate the handle 11B. The handle 11B is attached to the coupler (shaft) 121B of the encoder 12B, and the encoder 12B operates in response to rotating the handle 11B. Accordingly, the output from the encoder 12B (that is, the first signal S1B from the first terminal 122B) is outputted to an outside of the input device 100B through the FPC 35B (the first output part 21B) attached to the first substrate 34B where the encoder 12B is mounted.

Figure 13:
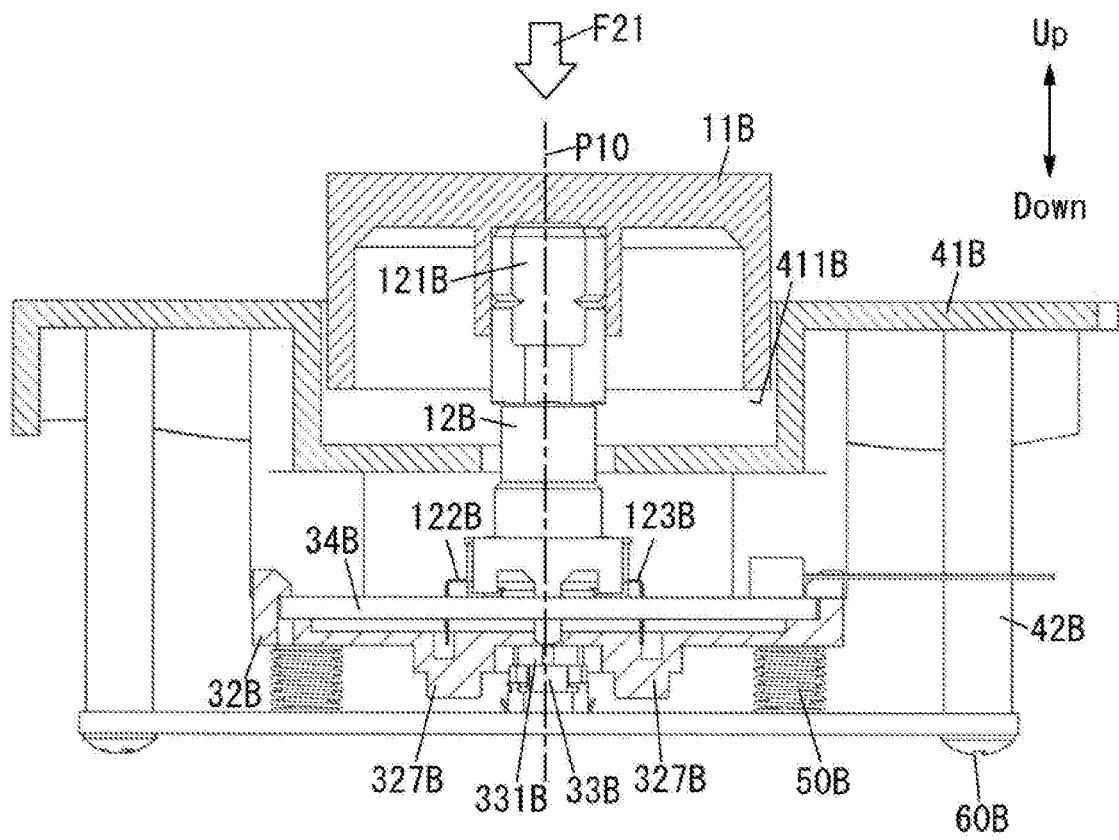
FIG. 13 is a section of the input device of Embodiment 2 in a pressed state.

When a user presses down the handle 11B in the state of FIG. 12, the handle 11B is moved downward and accordingly the coupler (shaft) 121B of the encoder 12B is also pressed down. FIG. 13 shows a state where a pressing force F21 is applied to the handle 11B of the input device 100B in a top-to-bottom direction. The encoder 12B incorporates a switch with a state switched according to downward movement of the coupler (shaft) 121B. In the state shown in FIG. 13, the switch incorporated in the encoder 12B has been switched to an on state according to downward movement of the handle 11B. It is possible to obtain, from the FPC 35B attached to the first substrate 34B, whether the state of the switch incorporated in the encoder 12B is switched. Accordingly, the output from the encoder 12B (that is, the second signal S2B from the second terminal 123B) is outputted to an outside of the input device 100B through the FPC 35B (the second output part 22B).

After that, a user presses down the handle 11B more deeply and accordingly force pressing down the handle 11B exceeds spring force of the elastic members 50B in due course. Thus, the movable member 32B supporting the first substrate 34B moves downward as a whole while compressing the elastic members 50B and keeping itself in an almost horizontal state. Note that, the switch incorporated in the encoder 12B is kept switched.

Figure 14:
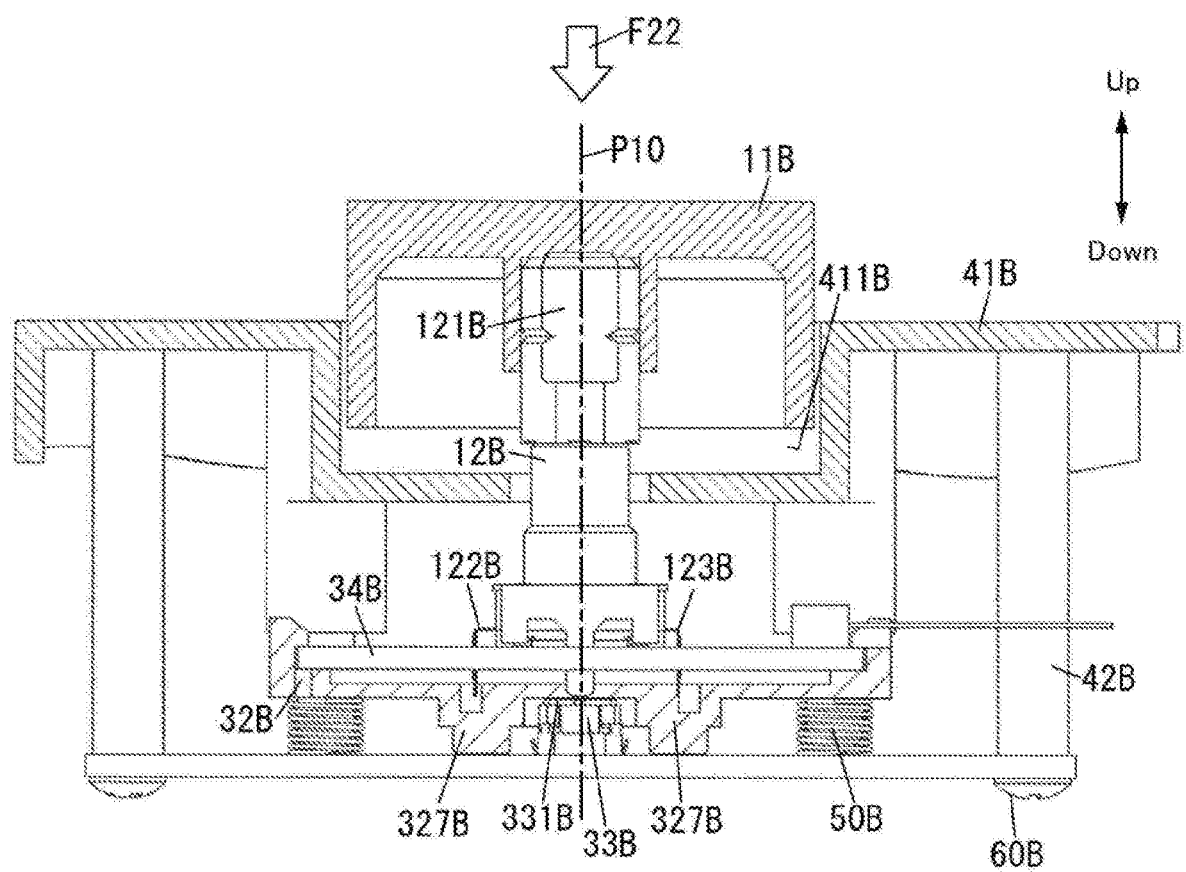
FIG. 14 is a section of the input device of Embodiment 2 in a more pressed state.
Figure 15:
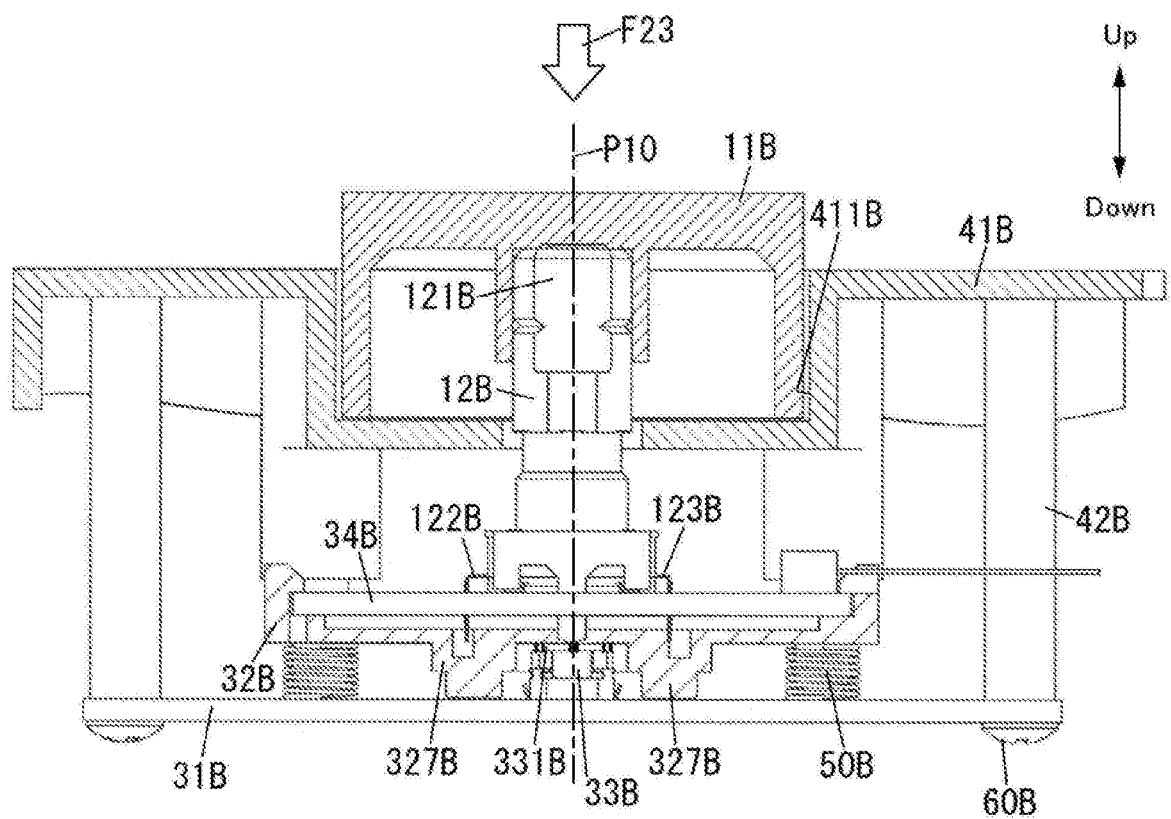
FIG. 15 is a section of the input device of Embodiment 2 in a further pressed state.

The movable member 32B moves downward as a whole, and finally, as shown in FIG. 14, the bottom surface of the movable member 32B comes into contact with the manipulation part 331B of the detector 33B located on the second substrate 31B. When the movable member 32B is further pressed down, the movable member 32B presses the manipulation part 331B of the detector 33B as shown in FIG. 15. Note that, FIG. 14 shows a state where top-to-bottom pressing force F22 is applied to the handle 11B of the input device 100B and the pressing force F22 is larger than the pressing force F21 shown in FIG. 13. FIG. 15 shows a state where top-to-bottom pressing force F23 is applied to the handle 11B of the input device 100B and the pressing force F23 is larger than the pressing force F22 shown in FIG. 14.

Accordingly, it is possible to obtain a signal (the third signal S3B) from the detector 33B. The detector 33B is a detection switch. As the detection switch, a switch which is switched in reception of force larger than force necessary to switch the switch incorporated in the encoder 12B. The output (the third signal S3B) from the detection switch can be obtained via the second substrate 31B. Note that, the movable member 32B is arranged to press the detection switch by its lower face. To prevent excessively pressing the manipulation part 331B of the detection switch, the stoppers 327B (see FIG. 10) are provided. The stoppers 327B come into contact with the second substrate 31B when the movable member 32B moves downward by a predetermined distance. In a state where the stoppers 327B are in contact with the second substrate 31B and downward movement of the movable member 32B is stopped (a state where the manipulation unit 10B reaches the second manipulation position), the detection switch has been already switched. In addition, a predetermined part of the handle 11B is accommodated in the recess 411B.

When the pressing force (pressing force F21, F22, F23) is removed, the movable member 32B is pressed up to its original position (the first manipulation position) by recovery force given by the elastic members 50B, and the switch incorporated in the encoder 12B recovers by itself. Accordingly, the handle 11B is returned to its original height position.

Accordingly, various inputs except rotation can be realized based on change in pressing force.

[Electronic Device of Embodiment 2]

Hereinafter, the electronic device 1000B including the input device 100B of Embodiment 2 is described with reference to FIG. 16. Note that, types of the electronic device 1000B may be same as those of the electronic device 1000A.

The electronic device 1000B includes a micro control unit (MCU) 200 electrically connected to the input device 100B. The MCU 200 includes a first input terminal 203, a second input terminal 202, and a third input terminal 201, like Embodiment 1. The first output part 21B, the second output part 22B, and the third output part 23B are electrically connected to the first input terminal 203, the second input terminal 202, and the third input terminal 201, respectively. Further, at least, a path between the first output part 21B and the first input terminal 203, a path between the second output part 22B and the second input terminal 202, and a path between the third output part 23B and the third input terminal 201 are electrically independent from each other.

The MCU 200 determines which of the input terminals (the first to third input terminals 203, 202, and 201) receives an output signal (the first to third signals S1B, S2B, S3B) as input, and determines a degree of such input based on durations, voltage waveforms, or electric pulses.

Further, the MCU 200 is electrically connected to an object (load 300) to be adjusted or controlled in the aforementioned electronic device. Examples of the object may include display devices, motors, light sources, timers, and speakers. The MCU 200 controls such objects via a control terminal 204.

As described above, since the electronic device 1000B includes the input device 100B of Embodiment 2, it can allow various forms of inputs by use of one manipulation unit 10B. This may lead to improvement of design, and improvement of handleability.

Note that, as to the electronic device 1000B including the input device 100B of Embodiment 2, the MCU 200 of the electronic device 1000B may be preferably configured to determine disappearing order of the output (the third signal S3B) of the detector 33B and the output (the second signal S2B) of the encoder 12B when force of pressing is removed. In this configuration, it is possible to suppress false operations. One example of such false operations is that the electronic device 1000B acknowledges only the second signal (detection signal) S2B even when the third signal (detection signal) S3B is outputted in addition to the second signal S2B.

In one example, when acknowledging disappearance of the second signal S2B only, the MCU 200 determines action for outputting the second signal S2B has been made. In another example, when acknowledging disappearance of the third signal S3B subsequent to disappearance of the second signal S2B, the MCU 200 determines that action for outputting the third signal S3B has been made. In another example, when acknowledging disappearance of the second signal S2B subsequent to disappearance of the third signal S3B, the MCU 200 determines that action for outputting the third signal S3B has been made.

Embodiment 3

[Input Device of Embodiment 3]

Hereinafter, an input device 100C of the present embodiment is described with reference to FIG. 17 to FIG. 24. Note that, each of FIG. 20 to FIG. 23 shows the input device 100C with its forward and rearward directions corresponding to an upward and downward direction shown in the illustration. However, there is no intent to limit how to use the input device 100C.

Figure 20:
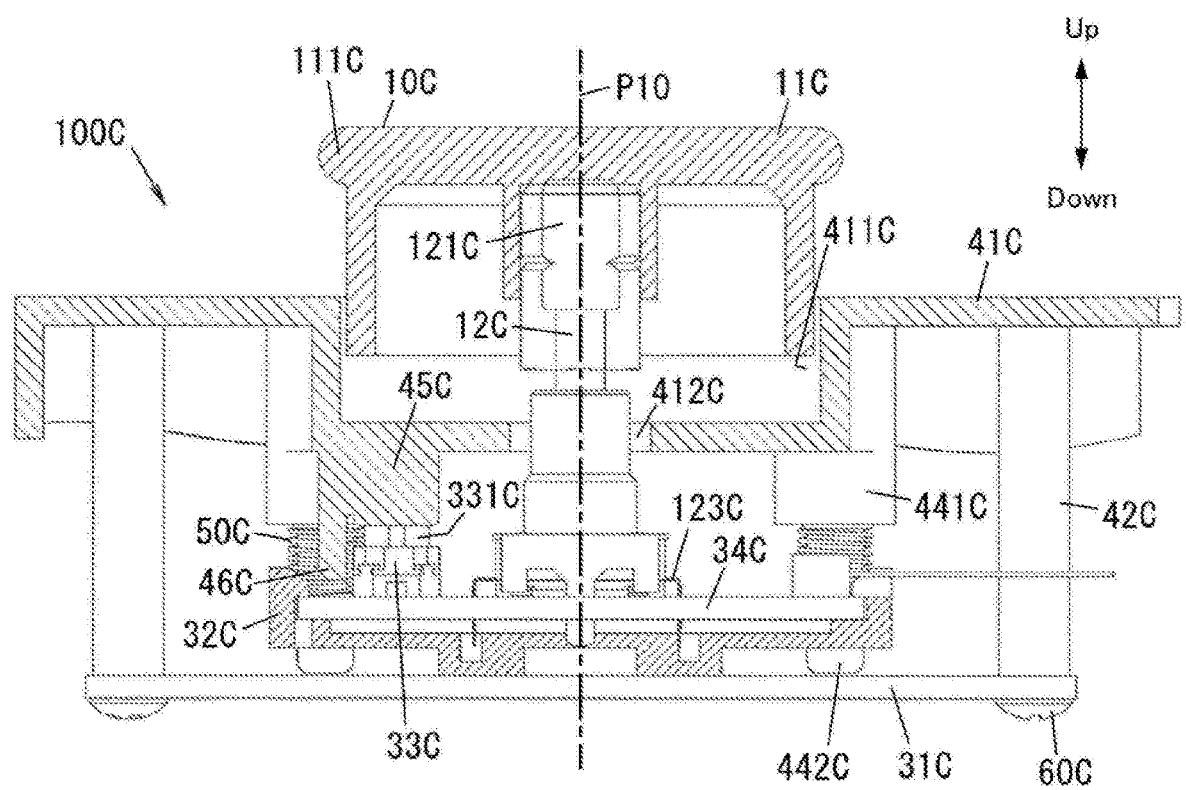
FIG. 20 is a section of the input device of Embodiment 3.

FIG. 20 shows the input device 100C, which includes a manipulation unit 10C, a body (casing) 40C, and a detector 33C. The manipulation unit 10C includes a handle (rotating part) 11C, allows rotation of the handle 11C around a rotational axis P10 and pressing of the handle 11C along the rotational axis P10, and is configured to output a first signal S1C (see FIG. 24) according to the rotation of the handle 11C and a second signal S2C (see FIG. 24) according to the pressing of the handle 11C. The body 40C holds the manipulation unit 10C to allow it to move from a first manipulation position (see FIG. 20) to a second manipulation position (see FIG. 23) along an opposite direction from a direction of the pressing the handle 11C. The detector 33C is configured to output a third signal S3C (see FIG. 24) when the manipulation unit 10C is in the second manipulation position.

According to the input device 100C, rotating the handle 11C causes the manipulation unit 10C to output the first signal S1C. Pressing the handle 11C causes the manipulation unit 10C to output the second signal S2C. Further pulling the handle 11C to move the manipulation unit 10C from the first manipulation position to the second manipulation position causes the detector 33C to output the third signal S3C. In summary, the input device 100C detects three actions which are rotating, pressing, and pulling of the handle 11C, and then outputs output signals (the first to third signals S1C to S3C) respectively corresponding to the actions. Therefore, various forms of inputs can be realized by use of one manipulation unit 10C. Thereby, the input device 100C is capable of controlling multiple electronic devices.

The present embodiment is similar to Embodiment 2 in directions of movement of a movable member 32C, but is different from Embodiment 2 in that a direction of movement of the movable member 32C causing output of the third signal S3C is an upward direction in the present embodiment in contrast to a downward direction in Embodiment 2. Accordingly, the detector 33C is mounted on the movable member 32C and movement of the movable member 32C causes the detector 33C to be sandwiched between the movable member 32C and a top portion 41C of a casing 40C, thereby the detector 33C being pressed.

In particular, when the handle 11C of the manipulation unit 10C is pulled upward, the movable member 32C is arranged to be moved upward together with the handle 11C. Therefore, in the present embodiment, there are elastic members 50C above the movable member 32C. The elastic members 50C are arranged to be compressed between the top portion 41C of the casing 40C and the movable member 32C when the movable member 32C is pulled upward. Further, upper part of the handle 11C serving as a rotator (rotating part) is formed into a flange shape, thereby facilitating pulling up of the handle 11C.

The input device 100C is described in more detail.

Figure 24:
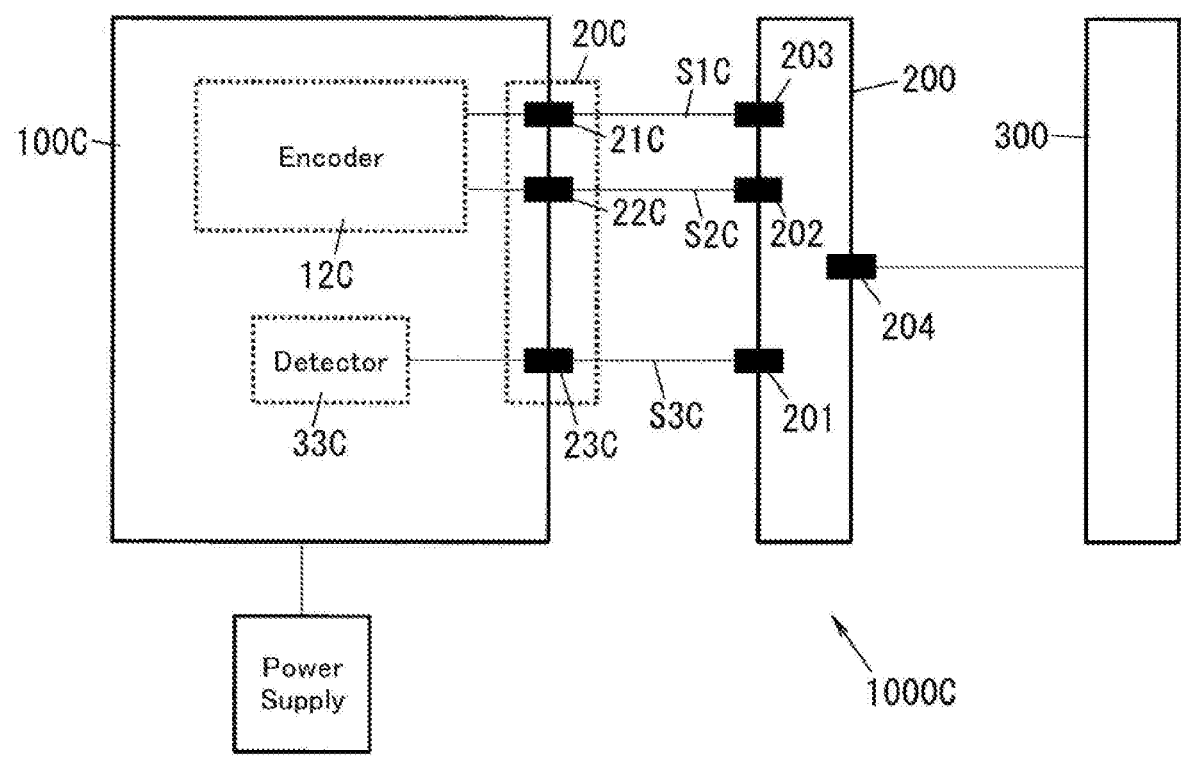
FIG. 24 is a schematic diagram of an electronic device including the input device of Embodiment 3.

The input device 100C includes the manipulation unit 10C (see FIG. 19) and an output unit 20C (see FIG. 24). The manipulation unit 10C (the handle 11C) is provided to be allowed to rotate and move along the rotational axis P10.

The output unit 20C outputs, in response to rotation of the manipulation unit 10C, the first signal S1C corresponding to rotational directions of the manipulation unit 10C. Further, the output unit 20C outputs the second signal S2C in response to movement of the manipulation unit 10C in a direction of pressing (in FIG. 20, the downward direction) along the rotational axis P10. Additionally, the output unit 20C outputs the third signal S3C in response to movement of the manipulation unit 10C in an opposite direction (in FIG. 20, the upward direction) of the direction of pressing along the rotational axis P10. In particular, as shown in FIG. 24, the output unit 20C includes a first output part 21C for outputting the first signal S1C, a second output part 22C for outputting the second signal S2C, and a third output part 23C for outputting the third signal S3C.

As described above, the input device 100C includes: the manipulation unit 10C (the handle 11C) which is provided to be allowed to rotate and move between a first position and a second position along the rotational axis P10; the first output part 21C for outputting the first signal S1C corresponding to rotational directions of the manipulation unit 10C; the second output part 22C for outputting the second signal S2C corresponding to the first position; and the third output part 23C for outputting the third signal S3C corresponding to the second position. In this regard, the first position is a position to which the handle 11C is moved from its initial position by pressing it. The second position is a position to which the handle 11C is moved from the first position by pulling it.

The input device 100C includes a basement unit 30C mechanically coupled to the manipulation unit 10C, in addition to the manipulation unit 10C and the output unit 20C which are described above (see FIG. 17). Further, the input device 100C includes the casing 40C.

The manipulation unit 10C includes the handle 11C and an encoder 12C. The handle 11C is similar to the handle 11B of Embodiment 2 but includes a flange 111C. The flange 111C protrudes outward from a front end of a circumferential surface of the handle 11C. The flange 111C is provided to facilitate pulling the handle 11C by a user. The encoder 12C is same as the encoder 12B of Embodiment 2. The encoder 12C includes a coupler (shaft) 121C, a first terminal 122C, and a second terminal 123C. The coupler 121C is coupled to the handle 11C. Further, the coupler 121C is interlocked with the handle 11C of the manipulation unit 10C so that the coupler 121C rotates in rotation directions of the handle 11C and moves toward the basement unit 30C. Therefore, the handle 11C is allowed to be rotated around the rotational axis P10 and pressed along the rotational axis P10 together with the coupler 121C.

The first terminal 122C outputs the first signal S1C according to the rotational directions of the coupler 121C. As one example, the first signal S1C is a signal indicative of a rotation angle around the rotational axis P10 of the handle 11C. The second terminal 123C outputs the second signal S2C according to movement of the coupler 121C toward the basement unit 30C.

The encoder 12C is mounted on a surface (in FIG. 20, the upper surface) of a first substrate 34C, and thereby the first terminal 122C and the second terminal 123C of the encoder 12C are electrically connected to the first substrate 34C. Especially, the rotational axis P10 of the coupler 121C of the encoder 12C coincides with (or is aligned with) an axis oriented along a thickness direction of the first substrate 34C. By doing so, the manipulation unit 10C is attached to the surface (in FIG. 20, the upper surface) of the first substrate 34C. Further, there is a flexible printed circuit board (FPC) 35C mounted on the first substrate 34C. The FPC 35C is provided to send output from the encoder 12C to an outside of the input device 100C. The FPC 35C includes the first output part 21C and the second output part 22C.

The basement unit 30C includes a second substrate 31C, the movable member 32C, and the detector 33C. The second substrate 31C may be a circuit board or a printed board, including electronic circuits, for example.

The movable member 32C is provided to move along the rotational axis P10 relative to the second substrate 31C. In addition, the movable member 32C holds the encoder 12C. In particular, the movable member 32C holds the first substrate 34C, thereby holding the encoder 12C mounted on the first substrate 34C. The movable member 32C has a rectangular plate shape. The first substrate 34C is attached to a first surface of the movable member 32C in an axis oriented along a thickness direction of the movable member 32C. Especially, the movable member 32C has at its first surface a recess 325C for accommodating the first substrate 34C and multiple claws 326C for keeping the first substrate 34C inside the recess 325C. Further, the movable member 32C includes at its four corners the through holes 322C for attaching the movable member 32C to the casing 40C so that the movable member 32C is movable along the rotational axis P10.

The detector 33C is positioned to be pressed by the casing 40C. The detector 33C outputs the third signal S3C according to movement of the movable member 32C along the rotational axis P10. Examples of the detector 33C may include a push switch, a membrane switch, and a pressure sensor. When pressed by the casing 40C, the detector 33C detects pressing of the casing 40C. In the present embodiment, the detector 33C includes a manipulation part 331C. When the manipulation part 331C is pressed, the detector 33C outputs the third signal S3C. As shown in FIG. 20, the detector 33C is located on the first substrate 34C.

The casing 40C includes a top portion 41C and pillar parts 42C. The top portion 41C includes a recess 411C for accommodating the handle 11C. Each of the pillar parts 42C includes an upper end coupled with the top portion 41C and a lower end coupled with the second substrate 31C serving as a bottom by a fixing 60C. In the present embodiment, the fixings 60C are screws. In particular, a through hole 412C for allowing the encoder 12C to pass is formed in a bottom of the recess 411C (see FIG. 20). Further, the casing 40C includes four pillar parts 42C and the four pillar parts 42C are located on a bottom surface of the top portion 41C to surround the recess 411C. Each of the pillar parts 42C includes a screw hole 421C at its top end. By inserting the fixings 60C into the screw holes 421C of the pillar parts 42C via through holes 311C of the second substrate 31C, the casing 40C is fixed to the second substrate 31C.

Further, the casing 40C includes multiple (four in the illustrated example) guides 44C as structure for supporting the movable member 32C to allow it to move in a direction (in FIG. 20, the upward and downward directions) along the rotational axis P10. The multiple guides 44C are located on the bottom surface of the top portion 41C to surround the recess 411C. Each of the guides 44C includes a pedestal 441C with a pillar shape protruding from the bottom surface of the top portion 41C and a leg 442C protruding from a top end of the pedestal 441C. The leg 442C is of a size to pass through the through hole 322C of the movable member 32C. In contrast, the pedestal 441C is of a size not to pass through the through hole 322C. In addition, the legs 442C are longer than the through holes 322C. Further, the legs 442C are formed to have their axial directions parallel to the rotational axis P10.

The movable member 32C is attached to the casing 40C by inserting the legs 442C of the guides 44C into the through holes 322C. Therefore, the movable member 32C is movable along the axial directions of the legs 442C of the guides 44C, which correspond to the rotational axis P10. Further, the casing 40C is fixed to the second substrate 31C. In this regard, the multiple elastic members 50C are disposed between the movable member 32C and the casing 40C. In particular, the elastic members 50C are engaged with the legs 442C of the guides 44C and positioned between the pedestals 441C and the movable member 32C. Note that, as shown in FIG. 20, the leg 442C of each of the guides 44C is in contact with the second substrate 31C while the casing 40C is fixed to the second substrate 31C.

Additionally, the casing 40C includes a pressing part 45C and a stopper 46C. The pressing part 45C is positioned on the bottom surface of the top portion 41C to face the manipulation part 331C of the detector 33C. A timing when the manipulation part 331C of the detector 33C is pressed due to movement of the movable member 32C can be set by adjusting a length of the pressing part 45C from the top portion 41C. To prevent excessively pressing of the manipulation part 331C of the detector 33C, the stopper 46C *comes* into contact with the first substrate 34C when the first substrate 34C moves upward by a predetermined distance (see FIG. 23).

As described above, the casing (body) 40C holds the movable member 32C to allow it to move in the direction (in FIG. 20, the upward and downward directions) along the rotational axis P10. The movable member 32C holds the manipulation unit 10C and the direction of pressing the handle 11C of the manipulation unit 10C corresponds to a direction along the rotational axis P10. Accordingly, the casing 40C holds the manipulation unit 10C to allow it to move from the first manipulation position to the second manipulation position along in the opposite direction from the direction of pressing the handle 11C. The first manipulation position is a position where the movable member 32C is farther from the casing 40C than in the second manipulation position. As described above, disposed between the movable member 32C and the casing 40C are the multiple elastic members 50C. These elastic members 50C each serve as a recovery member configured to transmit elastic force to the manipulation unit 10C to move the manipulation unit 10C from the second manipulation position to the first manipulation position. In this regard, the second substrate 31C is fixed to the casing 40C and the movable member 32C is positioned by the second substrate 31C. Accordingly, in the first manipulation position, the movable member 32C is in contact with the second substrate 31C (see FIG. 20). Further, in the second manipulation position, the stopper 46C of the casing 40C is in contact with the surface facing the casing 40C, of the first substrate 34C (see FIG. 23).

The input device 100C is configured to as described above and operates as follows. Operations of the input device 100C are described with reference to FIG. 20 to FIG. 23.

FIG. 20 shows a state (initial state) where no load is applied to the input device 100C. In this state, the manipulation unit 10C is in the first manipulation position. When the handle 11C is rotated in this state, the first signal S1C is outputted from the first terminal 122C of the encoder 12C, and then the first signal S1C is outputted through the first output part 21C (see FIG. 24).

Figure 21:
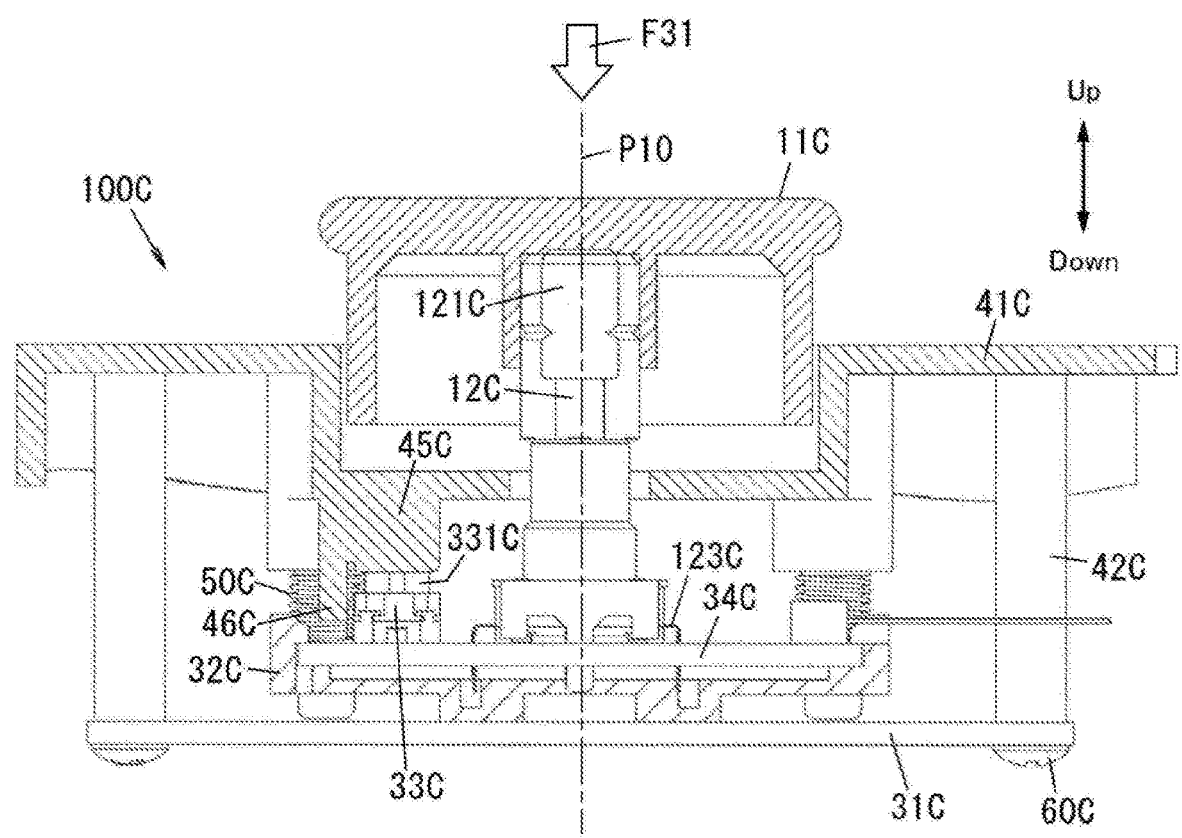
FIG. 21 is a section of the input device of Embodiment 3 in a pressed state.

FIG. 21 shows a state (pressed state) where a pressing force F31 is applied to the handle 11C of the input device 100C in a top-to-bottom direction. In this state, the second signal S2C is outputted from the second terminal 123C of the encoder 12C, and then the second signal S2C is outputted through the second output part 22C (see FIG. 24).

Figure 22:
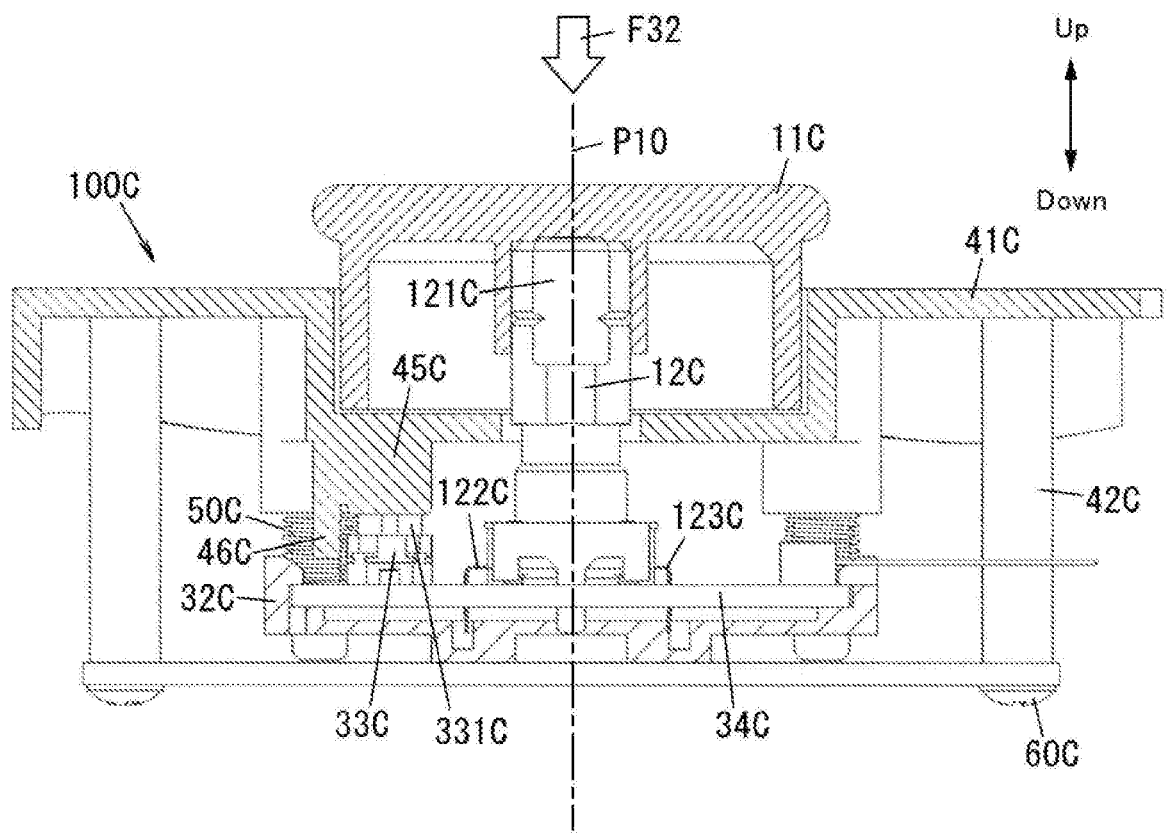
FIG. 22 is a section of the input device of Embodiment 3 in a more pressed state.

FIG. 22 shows a state (deeply pressed state) where larger top-to-bottom pressing force F32 is applied to the handle 11C in the pressed state shown in FIG. 21. In this state, the coupler 121C of the encoder 12C is inserted into a body of the encoder 12C and the handle 11C is further inserted into the recess 411C of the top portion 41C. When such mechanism is employed, the encoder 12C serves as a cushion in case the handle 11C is pressed strongly. Therefore, it is possible to buffer mechanical force applied to a circuit board (the first substrate 34C) caused when the encoder 12C presses the circuit board (the first substrate 34C).

Figure 23:
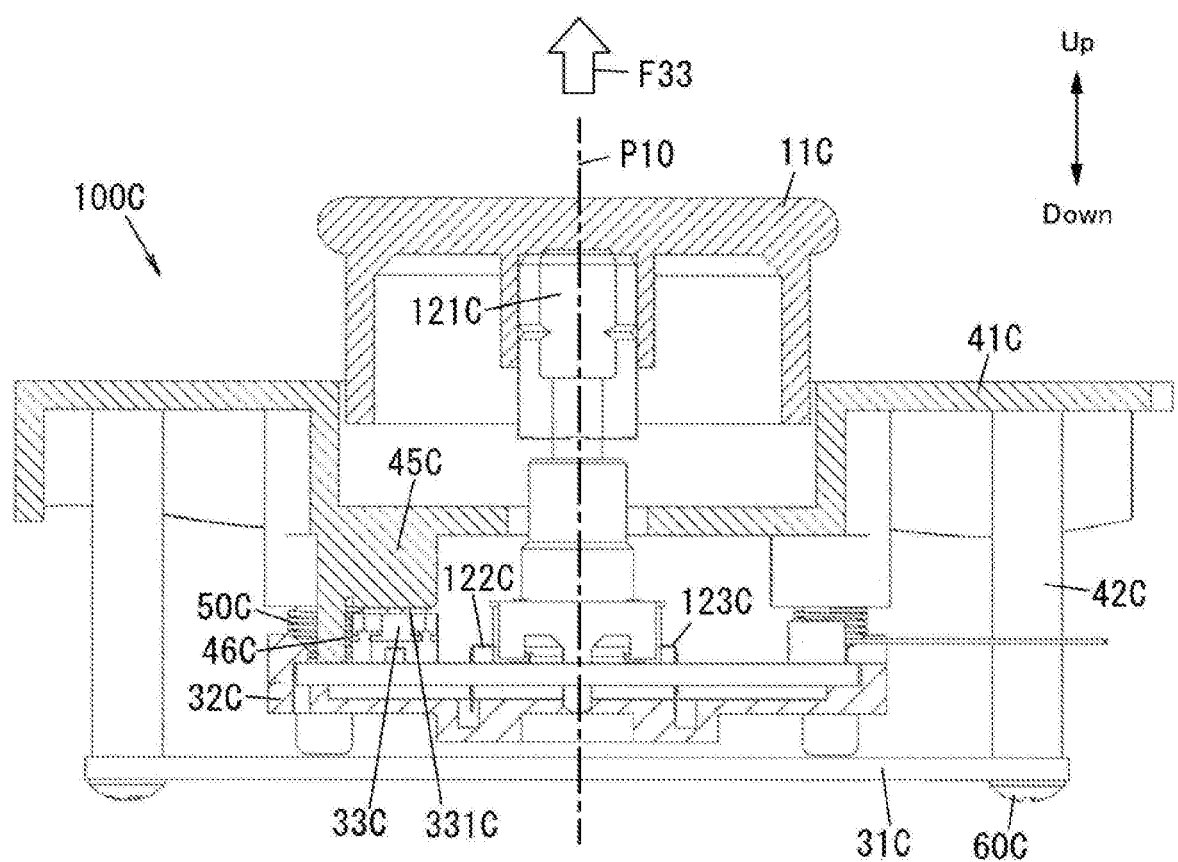
FIG. 23 is a section of the input device of Embodiment 3 in a pulled state.

FIG. 23 shows a state (pulled state) where the handle 11C serving as a rotator (rotating part) is pulled up in the initial state. In other words, FIG. 23 shows a state (pulled state) where bottom-to-top force F33 is applied to the handle 11C in the initial state. Accordingly, the movable member 32C (the manipulation unit 10C) is moved from the first manipulation position to the second manipulation position along the rotational axis P10. In this state, the third signal S3C is outputted from the detector 33C, and then the third signal S3C is outputted through the third output part 23C. When the force F33 for pulling is removed in this state, the elastic members 50C recovers the movable member 32C to the initial state, and thus output of the third signal S3C is stopped. In particular, due to the elastic members 50C, the movable member 32C (the manipulation unit 10C) returns from the second manipulation position to the first manipulation position.

The input device 100C configured as described above detects three actions of rotation, pressing, and pulling of the handle 11C, and outputs output signals (S1C, S2C, S3C) individually corresponding to the three actions. Therefore, various forms of inputs can be given by use of one manipulation unit 10C.

[Electronic Device of Embodiment 3]

Hereinafter, the electronic device 1000C including the input device 100C of Embodiment 3 is described with reference to FIG. 24. Note that, types of the electronic device 1000C may be same as those of the electronic device 1000A.

The electronic device 1000C includes a micro control unit (MCU) 200 electrically connected to the input device 100C. The MCU 200 includes a first input terminal 203, a second input terminal 202, and a third input terminal 201, like Embodiment 1. The first output part 21C, the second output part 22C, and the third output part 23C are electrically connected to the first input terminal 203, the second input terminal 202, and the third input terminal 201, respectively. Further, at least, a path between the first output part 21C and the first input terminal 203, a path between the second output part 22C and the second input terminal 202, and a path between the third output part 23C and the third input terminal 201 are electrically independent from each other.

The MCU 200 determines which of the input terminals (the first to third input terminals 203, 202, and 201) receives an output signal (the first to third signals S1C, S2C, S3C) as input, and determines a degree of such input based on durations, voltage waveforms, or electric pulses.

Further, the MCU 200 is electrically connected to an object (load 300) to be adjusted or controlled in the aforementioned electronic device. Examples of the object may include display devices, motors, light sources, timers, and speakers. The MCU 200 controls such objects via a control terminal 204.

As described above, since the electronic device 1000C includes the input device 100C of Embodiment 3, it can allow various forms of inputs by use of one manipulation unit 10C. This may lead to improvement of design, and improvement of handleability.

Embodiment 4

[Input Device of Embodiment 4]

Hereinafter, an input device 100D according to an exemplary embodiment of the present disclosure will be described with reference to FIGS. 25 to 31. FIGS. 27 to 30 illustrate the input device 100D in a front-rear direction corresponding to an up-down direction. However, this is not intended to limit how the input device 100D is used.

Figure 27:
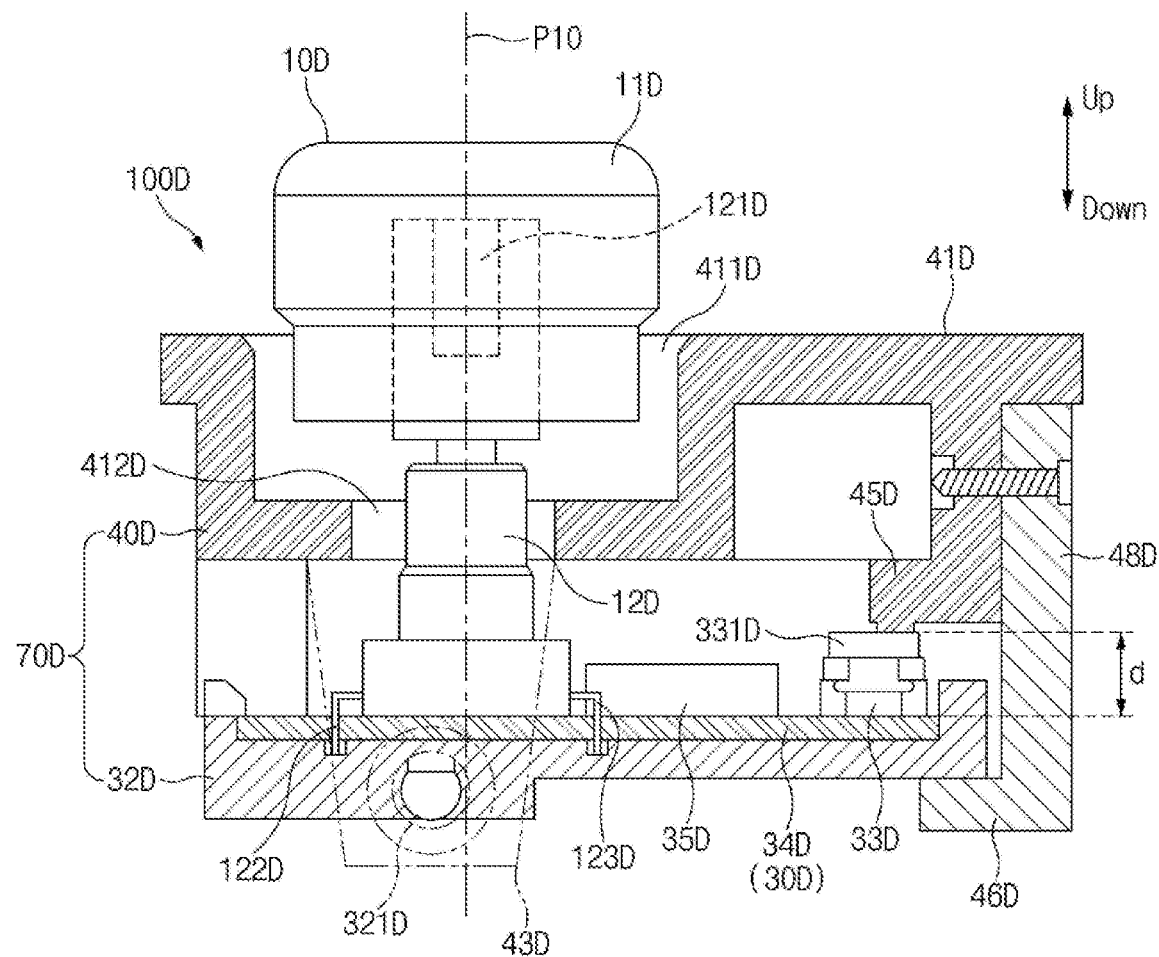
FIG. 27 is a cross-sectional view of an input device of Embodiment 4.

FIG. 27 illustrates the input device 100D including a manipulation unit 10D, a substrate 34D, a body (casing) 40D, a tilting mechanism 70D, and a detector 33D. The manipulation unit 10D may include a handle (rotating part) 11D, and the manipulation unit 10D may allow the handle 11D to rotate around a rotation axis P10, and press the handle 11D along the rotation axis P10. The manipulation unit 10D may be configured to output a first signal S1D (see FIG. 31) corresponding to the rotation of the handle 11D, and a second signal S2D (see FIG. 31) corresponding to the pressing of the handle 11D. The manipulation unit 10D may be connected to a surface (a top surface in FIG. 27) of the substrate 34D. The body 40D may be disposed to face the substrate 34D. The tilting mechanism 70D may include a cylindrical shaft 321D connected to the substrate 34D, and a bearing 43D fixed to the body 40D. The shaft 321D may be perpendicular to the rotation axis P10, and the bearing 43D may rotatably support the shaft 321D along the circumference of the shaft 321D. The tilting mechanism 70D may allow the substrate 34D to swing around the shaft 321D so that the substrate 34D may be movable between a first manipulation position (see FIG. 27) and a second manipulation position (see FIG. 30).

The detector 33D may be mounted on the surface (the top surface in FIG. 27) of the substrate 34D, and the detector 33D may be configured to output a third signal S3D (see FIG. 31) when the substrate 34D is in the second manipulation position.

The manipulation unit 10D may press the handle 11D to output the second signal S2D. The manipulation unit 10D may tilt the handle 11D to move the substrate 34D from the first manipulation position to the second manipulation position, and the detector 33D may output the third signal S3D. In other words, the input device 100D may detect three operations including the rotation of the handle 11D, the pressing of the handle 11D, and the tilting of the handle 11D, and output the first signal S1D, the second signal S2D, and the third signal S3D corresponding to the aforementioned operations, respectively. Thus, various forms of input may be allowed using the manipulation unit 10D.

Hereinafter, the input device will be described in detail.

Figure 31:
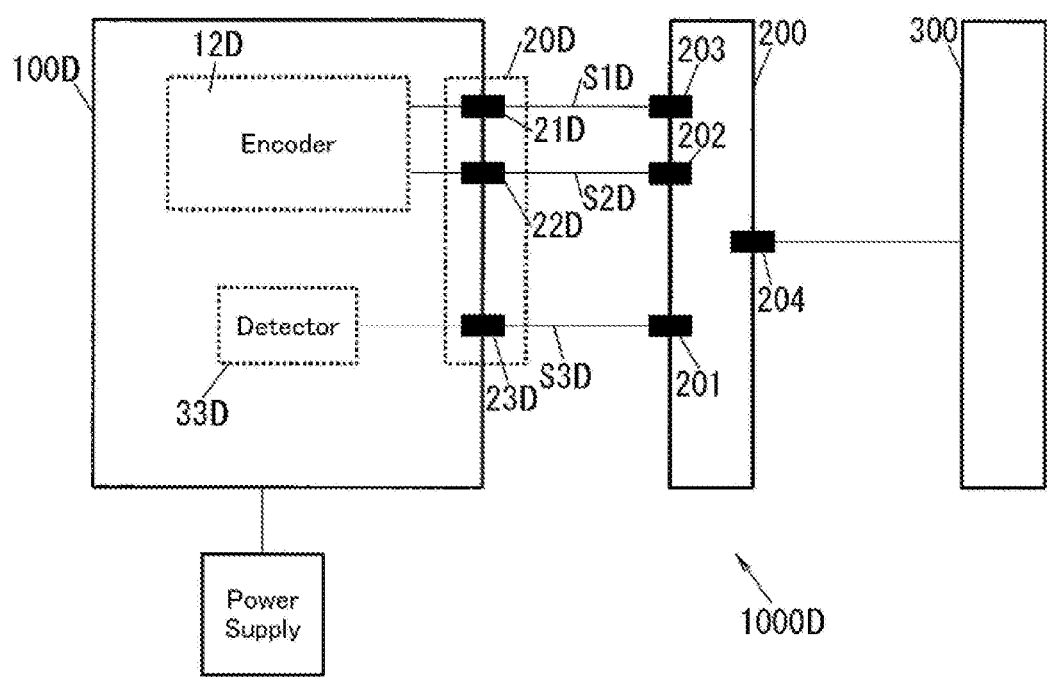
FIG. 31 is a schematic diagram of an electronic device including an input device of Embodiment 4.

The input device 100D may include the manipulation unit 10D (see FIG. 26) and an output unit 20D (see FIG. 31). The manipulation unit 10D (the handle 11D) may rotate around the rotation axis P10, move along the rotation axis P10, and move in a direction perpendicular to the rotation axis P10.

The output unit 20D may output the first signal S1D corresponding to the rotation direction of the manipulation unit 10D in response to the rotation of the manipulation unit 10D. In addition, the output unit 20D may output the second signal S2D in response to the movement of the manipulation unit 10D along the rotation axis P10. Furthermore, the output unit 20D may output the third signal S3D in response to the movement of the manipulation unit 10D in the direction perpendicular to the rotation axis P10.

The input device 100D having the above-described configuration may output a signal (the first signal S1D, the second signal S2D, or the third signal S3D) corresponding to individual movement of the manipulation unit 10D that is movable in various directions (the direction of rotation, the direction of movement along the rotation axis P10, and the direction of movement perpendicular to the rotation axis P10).

Thus, the input device 100D may provide various forms of input.

As described above, the input device 100D may include the manipulation unit 10D and the output unit 20D, and the input device 100D may further include a basement unit 30D and a casing 40D mechanically coupled to the manipulation unit 10D.

Figure 26:
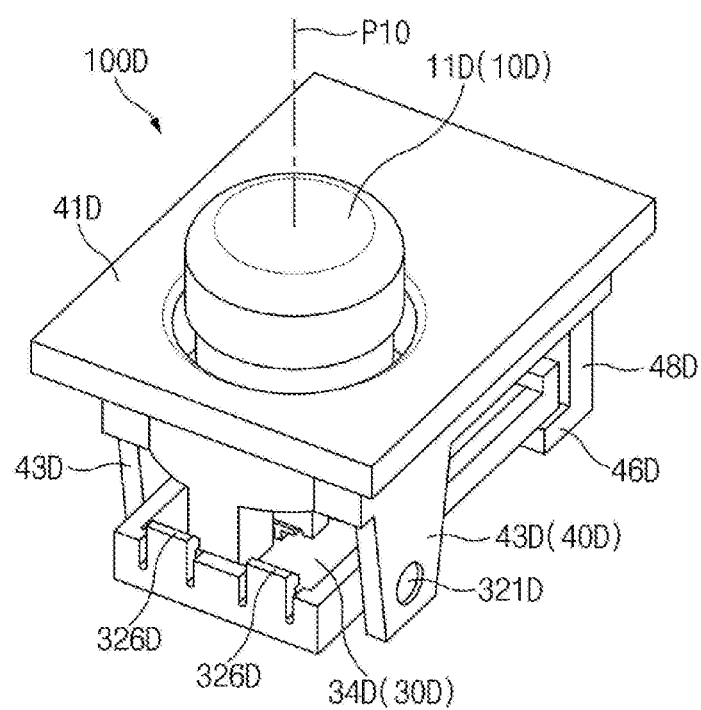
FIG. 26 is a perspective view of an input device of Embodiment 4.

As illustrated in FIG. 26, the manipulation unit 10D may include the handle 11D and an encoder 12D, and the encoder 12D is an example of a rotating operation electronic part. The handle 11D may be used by a user to manually operate the input device 100D. The handle 11D may be a rotating part which is rotatably coupled to the encoder 12D. In particular, the handle 11D may have a cylindrical shape having an open bottom. The encoder 12D may be positioned between the handle 11D and the basement unit 30D. The encoder 12D may be mechanically coupled to the handle 11D. In addition, the encoder 12D may be mechanically coupled to the basement unit 30D. Alternatively, the encoder 12D may be an absolute type encoder or an increment type encoder. Alternatively, a variable resistor, which is classified as a rotating operation electronic part that allows pressing (pushing) like the encoder 12D, may replace the encoder 12D.

The encoder 12D may include a coupler 121D, a first terminal 122D, and a second terminal 123D. The coupler 121D may be coupled to the handle 11D. In addition, the coupler 121D may be cooperated with the handle 11D of the manipulation unit 10D to be rotatable in the rotation direction of the handle 11D and move toward the basement unit 30D. More specifically, the encoder 12D may have a substantially cylindrical shape, and the encoder 12D may include the coupler 121D provided at a first end portion thereof, and the first and second terminals 122D and 123D provided at a second end portion thereof. The coupler 121D may rotate around the rotation axis P10, and be pressed along the rotation axis P10. As illustrated in FIG. 27, the handle 11D may be coupled to the coupler 12D. Thus, the handle 11D together with the coupler 121D may rotate around the rotation axis P10, and be pressed along the rotation axis P10.

The first terminal 122D may output the first signal S1D corresponding to the rotation direction of the coupler 121D. That is, the first signal S1D may be a signal corresponding to the degree of rotation of the handle 11D. For example, the first signal S1D may have a signal level corresponding to the degree of rotation of the handle 11D. Specifically, the first signal S1D may be a signal indicative of a rotation angle of the handle 11D around the rotational axis P10. The second terminal 123D may output the second signal S2D corresponding to the movement of the coupler 121D toward the basement unit 30D. That is, the second signal S2D may be a signal corresponding to the pressing of the handle 11D. For example, the second signal S2D may have a signal level corresponding to the degree of pressing of the handle 11D.

The encoder 12D may be mounted on the surface (the top surface in FIG. 27) of the substrate 34D, and the first terminal 122D and the second terminal 123D of the encoder 12D may be electrically connected to the substrate 34D. In particular, the rotation axis P10 of the coupler 121D of the encoder 12D may coincide with (or is aligned with) an axis oriented along a thickness direction of the substrate 34D. Thus, the manipulation unit 10D may be attached to the surface (the top surface in FIG. 27) of the substrate 34D. In addition, a flexible printed circuit board (FPCB) 35D may be mounted on the substrate 34D. The FPCB 35D may transmit an output signal from the encoder 12D to the outside of the input device 100D. The FPCB 35D may include a first output part 21D and a second output part 22D.

The basement unit 30D may include a movable member 32D and the detector 33D.

The movable member 32D may support the encoder 12D and the detector 33D. More specifically, the movable member 32D may support the substrate 34D, thereby supporting the encoder 12D and the detector 33D mounted on the substrate 34D. The movable member 32D may have a fulcrum located between an effort point and load point so that the movable member 32D may be tilted from its initial position toward two opposing positions like a seesaw. Alternatively, by preventing the movable member 32D from moving from the initial position toward the opposite direction thereto, the movable member 32D may be allowed to only move in one direction from a reference point, and the movable member 32D may have the load point positioned between the effort point and the fulcrum or the effort point positioned between the load point and the fulcrum. Alternatively, the movable member 32D may be a flat plate.

The movable member 32D may move like the motion of a seesaw, and the axis of the fulcrum of the seesaw motion and the rotation axis P10 of the handle 11D or the coupler 121D may not intersect at right angles (may not cross each other). That is, the axis of the fulcrum of the seesaw motion and the rotation axis P10 may be offset from each other, which may prevent the pressing of the coupler 121D (movement along the rotation axis P10) from having an effect on the movable member 32D.

Figure 25:
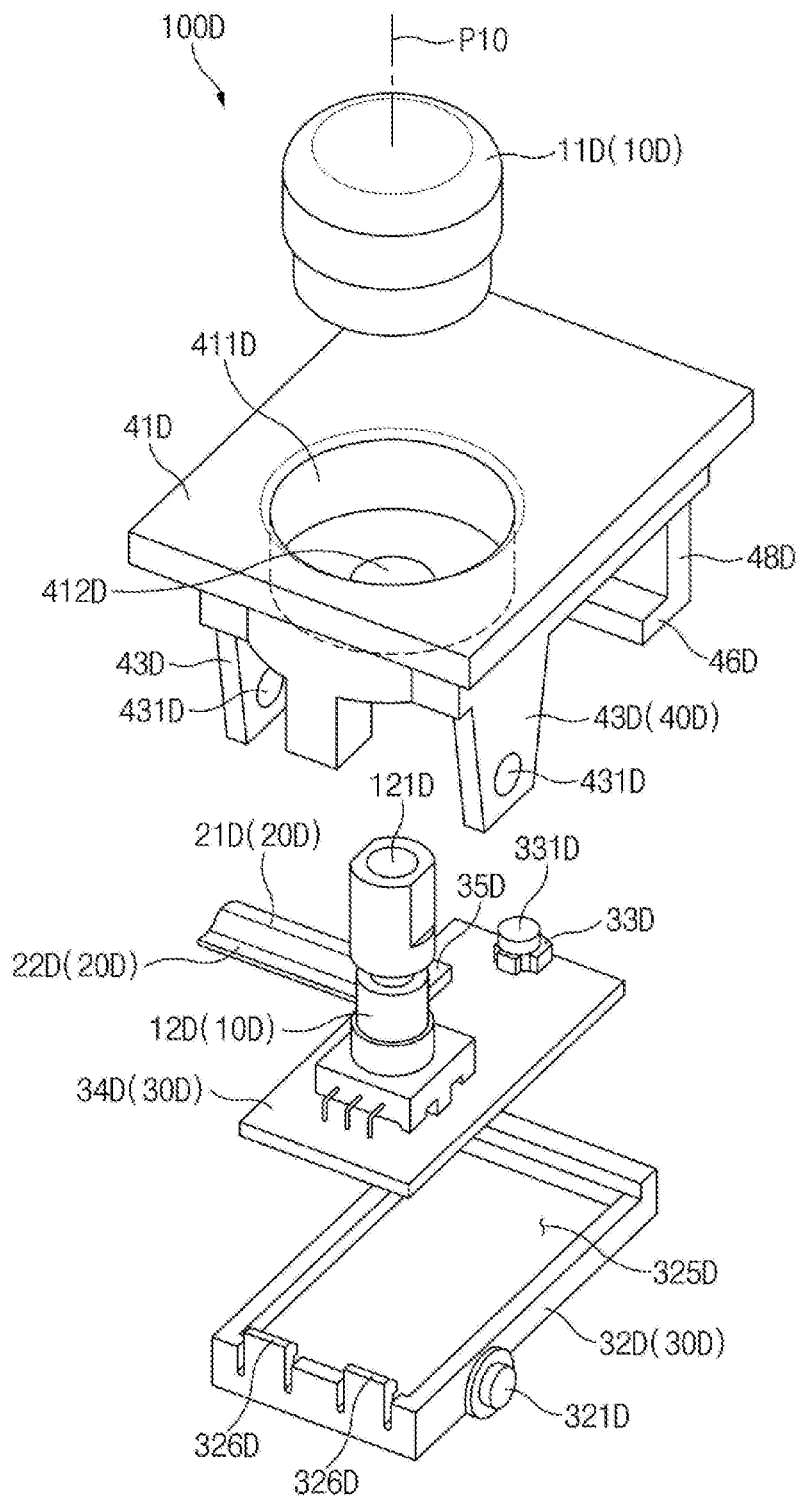
FIG. 25 is a top exploded perspective view of an input device of Embodiment 4.

More specifically, the movable member 32D may have the pair of shafts 321D. The movable member 32D may have a rectangular plate shape. The pair of shafts 321D may extend in the direction perpendicular to the rotation axis P10 of the handle 11D. As illustrated in FIG. 25, the pair of shafts 321D may protrude from opposing sides of the movable member 32D on an axis oriented along a width direction of the movable member 32D. As illustrated in FIGS. 25 and 27, the substrate 34D may be attached to a first surface of the movable member 32D in an axis oriented along a thickness direction of the movable member 32D. The movable member 32D may include a recess 235D formed in the first surface, and the recess 325D may receive the substrate 34D. The movable member 32D may have a plurality of claws 326D to retain the substrate 34D received in the recess 325D.

The detector 33D may be positioned to be pressed by the movable member 32D. As the movable member 32D moves in a tilting direction, the detector 33D may output the third signal S3D. For example, the detector 33D may include a push switch, a membrane switch, or a pressure sensor. When the detector 33D is pressed by the movable member 32D, the detector 33D may detect the tilting of the movable member 32D. In the exemplary embodiment, the detector 33D may include an operation part 331D. When the operation part 331D is pressed, the detector 33D may output the third signal S3D.

According to an exemplary embodiment, the detector 33D may be a tact switch having an elastically movable contact or an elastic member. When a force is removed from the operation part 331D (the operation part 331D is not pressed), the operation part 331D of the detector 33D may return to its original position by the elastically movable contact or the elastic force of the elastic member.

In the exemplary embodiment, the detector 33D may be mounted on the substrate 34D, and the detector 33D and the encoder 12D may be spaced apart from each other in a longitudinal direction of the substrate 34D. The detector 33D may be positioned on the substrate 34D, and when the movable member 32D moves in a tilting direction, the detector 33D may be pressed by a pressing rib 45D of the casing 40D and the movable member 32D.

The casing 40D may include a top portion 41D and a through hole 431D into which the shaft 321D of the movable member 32D is inserted. The top portion 41D may include a recess 411D receiving the handle 11D. More specifically, a through hole 412D may be formed in the bottom of the recess 411D to allow the encoder 12D to pass therethrough.

In addition, the casing 40D may include the pair of bearings 43D supporting the movable member 32D to allow the swinging of the movable member 32D. The pair of bearings 43D may be formed on both sides of a bottom surface of the top portion 41D in relation to the through hole 412D. Each bearing 43D may include the through hole 431D. The pair of shafts 321D of the movable member 32D may be fit into the through holes 431D in the pair of bearings 43D, respectively, and the movable member 32D may swing around the shafts 321D with respect to the casing 40D. The substrate 34D to which the manipulation unit 10D is connected may be attached to the movable member 32D. Thus, the casing 40D and the movable member 32D may constitute the tilting mechanism 70D in which the substrate 34D swings around the shafts 321D, and the tilting mechanism 70D may be configured to allow the substrate 34D to move between the first manipulation position (see FIG. 27) and the second manipulation position (see FIG. 30). For example, the first manipulation position may be a position where the rotation axis P10 of the coupler 121D of the encoder 12D coincides with (or is aligned with) the axis oriented along the thickness direction of the substrate 34D. For example, the second manipulation position may be a position where the pressing rib 45D of the casing 40D contacts the detector 33D.

In addition, the casing 40D may include the pressing rib 45D and a stopper 46D. The pressing rib 45D may be disposed on the bottom of the top portion 41C of the casing 41D to face the operation part 331D of the detector 33D. The pressing rib 45D and the substrate 34D may be spaced apart from each other by a predetermined distance d. A timing at which the operation part 331D of the detector 33D is pressed by the movement of the movable member 32D may be set by varying the distance d between the substrate 34D and the pressing rib 45D.

According to an exemplary embodiment, when the detector 33D is a tact switch having an elastically movable contact or an elastic member, the distance d between the substrate 34D and the pressing rib 45D may be the same as a length of the detector 33D. When the operation part 331D of the detector 33D is not pressed, the distance d between the substrate 34D and the pressing rib 45D may be stably maintained by the elastically movable contact of the detector 33D or the elastic force of the elastic member, thereby facilitating the return of the movable member 32D from the second manipulation position to the first manipulation position.

The movable member 32D may have a first end portion and a second end portion at both ends thereof in a longitudinal direction thereof. The shaft 321D may be close to the first end portion, and the detector 33D may be close to the second end portion. The stopper 46D may support the second end portion of the movable member 32D to allow the movable member 32D to maintain the first manipulation position. The top portion 41D of the casing 41D may be provided with a vertical portion 48D extending therebelow in a vertical direction, and the stopper 46D may extend horizontally from a bottom end of the vertical portion 48D. The stopper 46D may support a bottom surface of the second end portion of the movable member 32D, thereby allowing the movable member 32D to maintain the first manipulation position. When the movable member 32D swings around the shaft 321D, the second end portion of the movable member 32D may be movable between the pressing rib 45D and the stopper 46D, and when a tilting force on the movable member 32D is removed, the movable member 32D may be restored from the second manipulation position to the first manipulation position by its own weight (self-weight). More specifically, as the shaft 321D is closer to the first end portion than to the second end portion, the shaft 321D may be deflected from the center of the movable member 32D toward the first end portion. Thus, the movable member 32D may easily be restored from the second manipulation position to the first manipulation position by its own weight.

In the exemplary embodiment, it is not necessary to provide a restoring force for restoring the movable member 32D from the second manipulation position to the first manipulation position, the elastic member may be eliminated.

As described above, the input device 100D may include: the manipulation unit 10D (the handle 11D) which is rotatable, is movable along the rotation axis P10, and is movable in the direction perpendicular to the rotation axis P10; and the output unit 20D outputting the first signal S1D corresponding to the rotation direction of the manipulation unit 10D (the handle 11D), the second signal S2D corresponding to the movement of the manipulation unit 10D (the handle 11D) along the rotation axis P10, and the third signal S3D corresponding to the movement of the manipulation unit 10D (the handle 11D) in the direction perpendicular to the rotation axis P10.

The input device 100D may further include the basement unit 30D which is mechanically coupled to the manipulation unit 10D. The manipulation unit 10D may include the rotating part (handle) 11D, and the rotating operation electronic part (encoder) 12D which is positioned between the rotating part 11D and the basement unit 30D. The rotating operation electronic part 12D may be mechanically coupled to the rotating part 11D. The rotating operation electronic part (encoder) 12D may include the coupler 121D, and the coupler 121D may rotate in the rotation direction and move toward the basement 30D. The rotating operation electronic part (encoder) 12D may include the first terminal 122D outputting the first signal S1D corresponding to the rotation direction of the coupler 121D, and the second terminal 123D outputting the second signal S2D corresponding to the movement of the coupler 121D toward the basement unit 30D. The basement unit 30D may include the movable member 32D which is tiltable, and the movable member 32D may support the rotating operation electronic part (encoder) 12D. The basement unit 30D may be disposed to be pressed by the movable member 32D and the pressing rib 45D of the casing 40D, and may include the detector 33D outputting the third signal S3D corresponding to the movement of the movable member 32D in the tilting direction thereof. The output unit 20D may include the first output part 21D electrically connected to the first terminal 122D, the second output part 22D electrically connected to the second terminal 123D, and a third output part 23D electrically connected to the third terminal (detector) 33D.

The input device 100D having the above-described configuration may operate as below. The operation of the input device 100D will be described with reference to FIGS. 27 to 30.

FIG. 27 illustrates an initial state in which no load is applied to the input device 100D. In this state, the substrate 34D may be in the first manipulation position. When the handle 11D rotates around the rotation axis P10 in this state, the first signal S1D may be output from the first terminal 122D of the encoder 12D, and the first signal S1D may be output through the first output part 21D (see FIG. 31).

Figure 28:
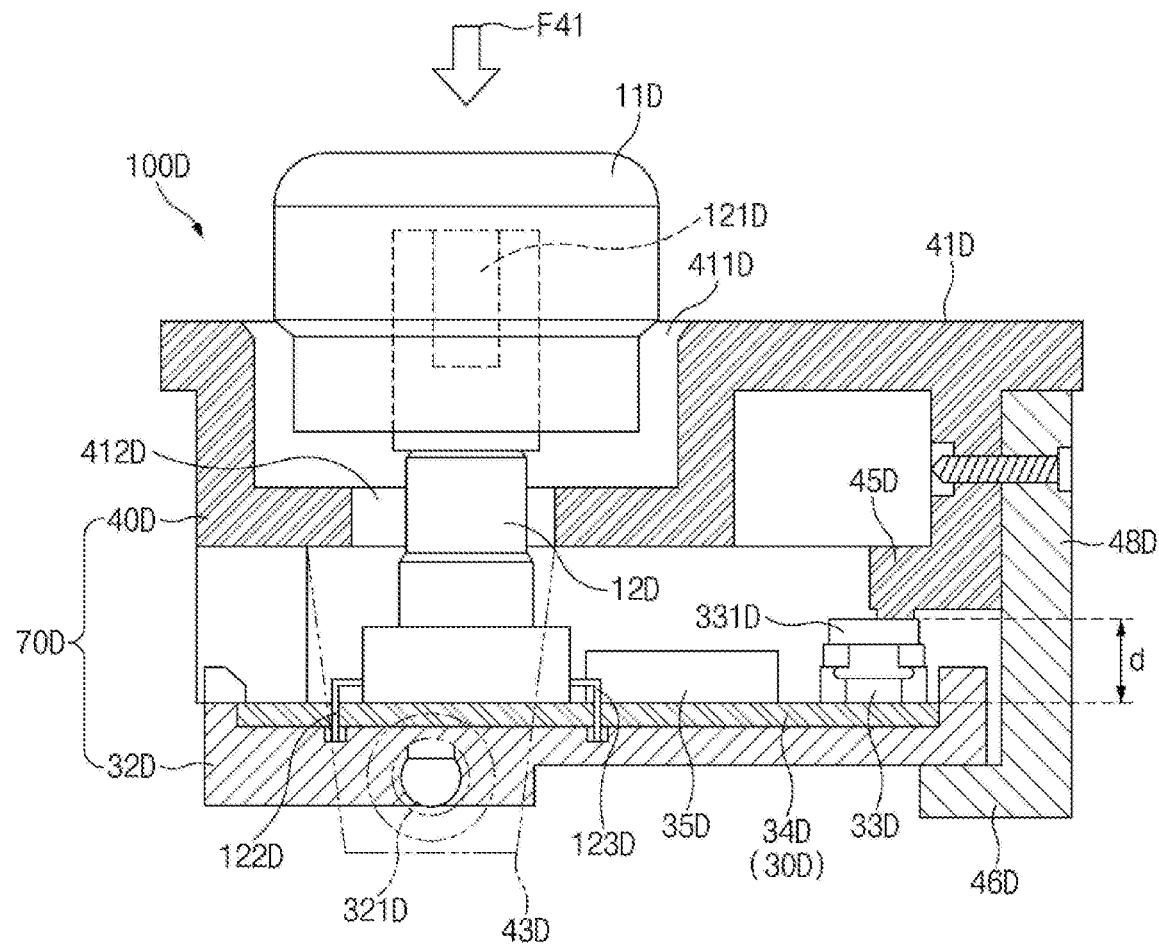
FIG. 28 is a cross-sectional view of a pressed state of an input device of Embodiment 4.

FIG. 28 illustrates a pressing state in which a pressing force F41 is applied to the handle 11D of the input device 100D in a top-to-bottom direction. Due to the pressing of the handle 11D in this state, the second signal S2D may be output from the second terminal 123D of the encoder 12D, and the second signal S2D may be output through the second output part 22D (see FIG. 28).

Figure 29:
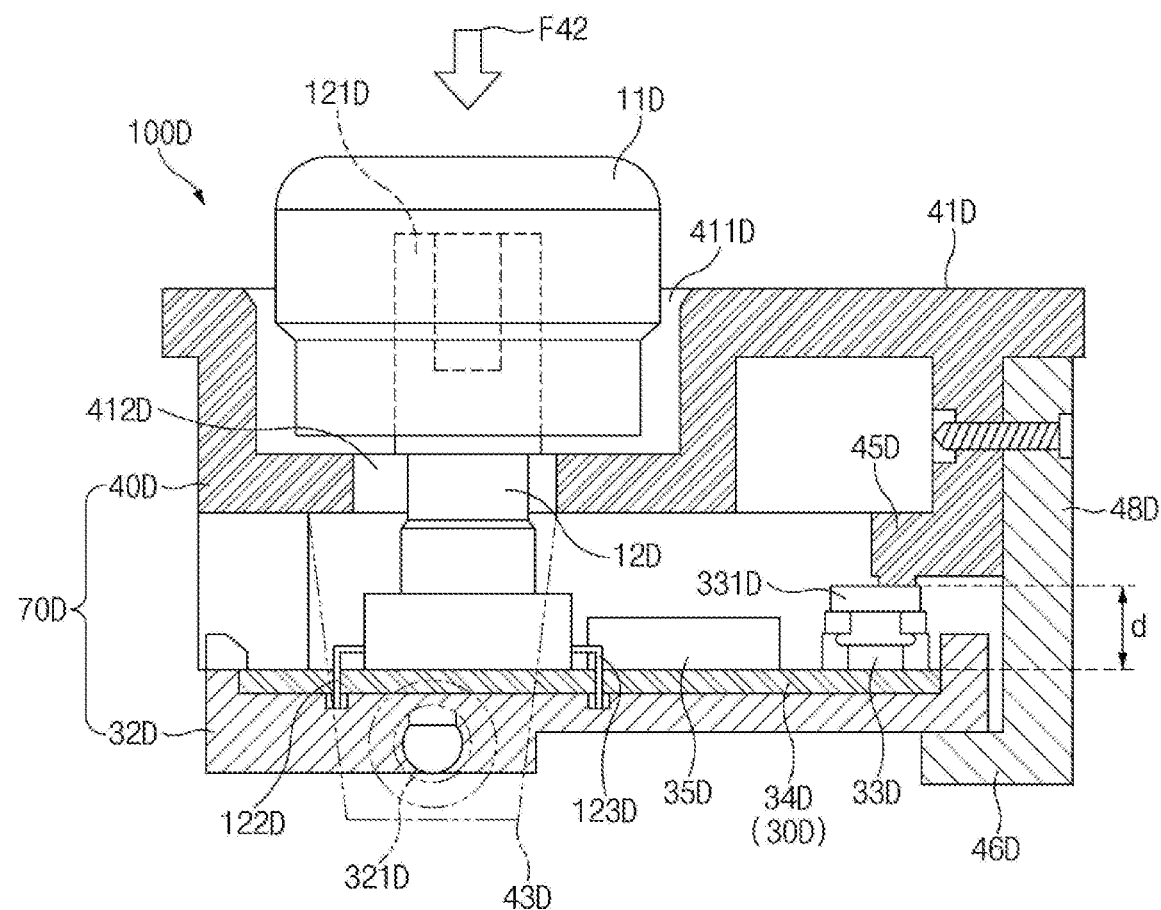
FIG. 29 is a cross-sectional view of a more pressed state of an input device of Embodiment 4.

FIG. 29 illustrates a deep pressing state in which a pressing force F42 greater than the pressing force F41 of FIG. 28 is applied to the handle 11D of the input device 100D in the top-bottom direction. In this state, the coupler 121D of the encoder 12D may be inserted into a body of the encoder 12D, and the handle 11D may be further inserted into the recess 411D of the top portion 41D. When such a mechanism is applied, and the handle 11D is strongly pressed, the encoder 12D may serve as a cushion. Thus, when the encoder 12D presses the substrate 34D, it may buffer the mechanical force applied to the substrate 34D.

Figure 30:
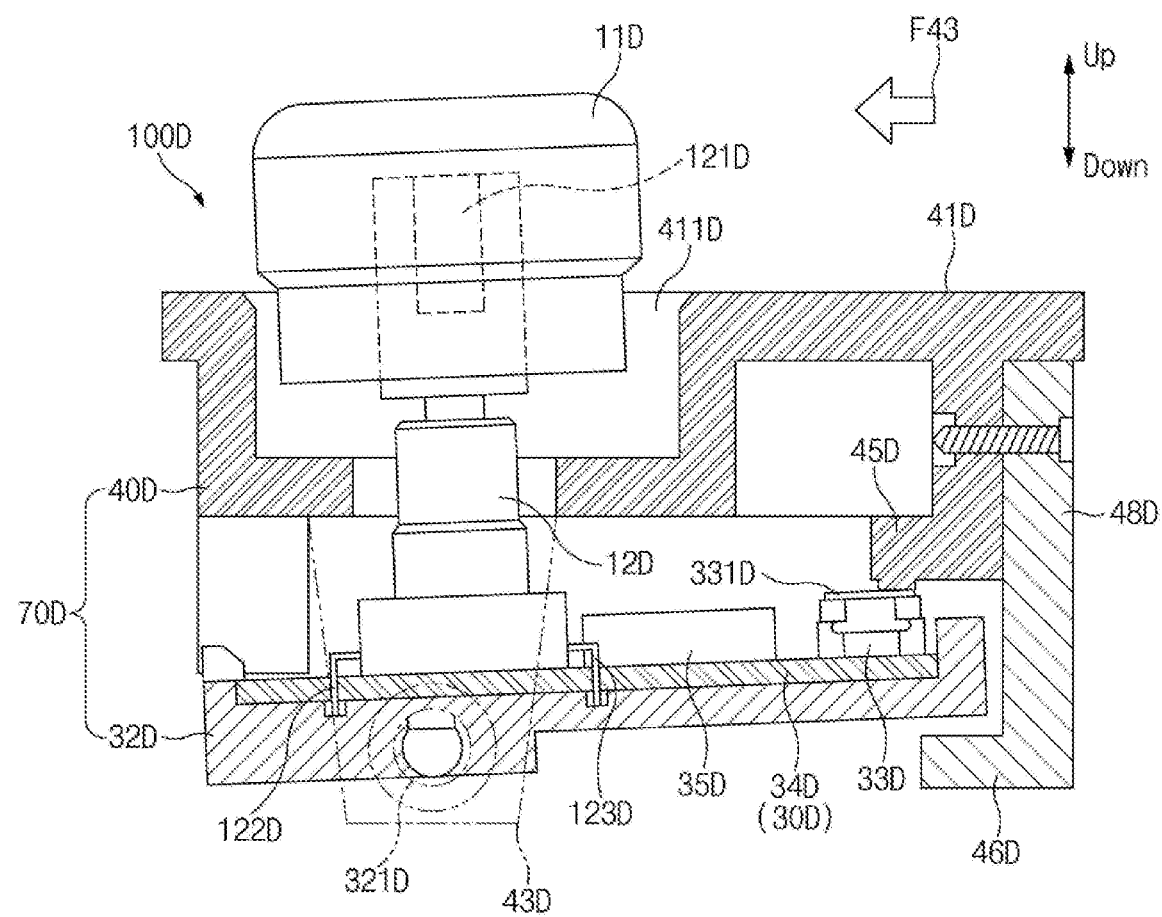
FIG. 30 is a cross-sectional view of a tilted state of an input device of Embodiment 4.

FIG. 30 illustrates a tilting state in which a force F43 is applied to the handle 11D of the input device 100D in a direction perpendicular to the rotation axis P10 (a left direction in FIG. 30). Accordingly, the movable member 32D and the substrate 34D may swing around the shaft 321D, and move from the first manipulation position to the second manipulation position. In this state, the third signal S3D may be output from the detector 33D, and the third signal S3D may be output through the third output part 23D. In FIG. 30, a pressed portion of the movable member 32D may move upward, and accordingly, the detector 33D may be moved upward by the movable member 32D, and the detector 33D may be pressed by the pressing rib 45D of the casing 40D. However, a portion of the movable member 32D opposing the pressed portion of the movable member 32D may move downward, and accordingly, the detector 33D may be pressed upward by the movable member 32D. In this state, when the tilting force is removed, the movable member 32D may be restored from the second manipulation position to the first manipulation position due to the self-weight of the movable member 32D and/or the elastic force of the elastically movable contact of the detector 33D.

As described above, the input device 100D may detect three operations including the rotation of the handle 11D, the pressing of the handle 11D, and the tilting of the handle 11D, and output the output signals S1D, S2D, and S3D corresponding to the three operations, respectively. Thus, various forms of input may be allowed by one input unit 10D.

[Electronic Device of Embodiment 4]

Examples of an electronic device 1000D include: input devices such as remote controllers; AV devices such as recorders, televisions, video players, light fixtures such as ceiling fixture, indirect lighting devices, and spotlights; electrical appliances such as air conditioners, freezers, cleaning appliances, and dryers; vehicles such as electric vehicles, gas powered vehicles, hybrid vehicles, and motorcycles; and electronic devices for vehicles such as vehicle navigation systems, vehicle audio systems, in-vehicle televisions, and vehicle air conditioners.

A micro control unit (MCU) 200 may include a first input terminal 203, a second input terminal 202, and a third input terminal 201. The first input unit 21D, the second input unit 22D, and the third input unit 23D may be electrically connected to the first input terminal 203, the second input terminal 202, and the third input terminal 201, respectively. In addition, a path between the first output part 21D and the first input terminal 203, a path between the second output part 22D and the second input terminal 202, and a path between the third output part 23D and the third input terminal 201 may be electrically independent of each other.

The MCU 200 may determine which input device (the first to third input terminals 203, 202, and 201) receives an output signal (the first to third output signals S1D, S2D, and S3D) as input corresponding thereto. The MCU 200 may determine the above-described input level based on duration, voltage waveforms, or electric pulses.

The MCU 200 may be electrically connected to an object (a load) 300 to regulate or control the object 300 in the above-described electronic device. Examples of the object include a display device, a motor, a lighting device, a timer, and a speaker. The MCU 200 may control the object 300 through a control terminal 204.

For example, the input device 100D according to exemplary embodiments may be electrically connected to a vehicle audio system, a vehicle air conditioner, a vehicle lighting system, and an in-vehicle television. A target of output may be switched among the vehicle audio system, the vehicle air conditioner, the vehicle lighting system, and the in-vehicle television by tilting. The target of output may be switched to the vehicle air conditioner in response to left tilting. The target of output may be switched to the in-vehicle television in response to rear tilting. Alternatively, the target of output may be switched whenever the left tilting is made.

Optionally, when tilting is not continuous for a set time, it may be ignored. In this case, when pressing or rotation is made within the set time after tilting, it may be regarded as input. Thus, a user may not need to remember a previous operation. When a current target of the output is displayed on a monitor or the like, the user may not need to check it every time the input is processed.

Alternatively, in order to display color vision information to inform the user of the target of output, the manipulation unit 10D (the handle 11D) may be made of a transparent material, and a light source such as LED, LCD, and an organic electroluminescent device may be disposed inside the input device 100D.

For example, various parameters such as sound volume, temperature, air volume, brightness, and chromaticity may be adjusted according to rotation. For example, as the temperature on the air conditioner increases, the color may become red (warm color), and as the temperature on the air conditioner decreases, the color may become blue (cold color). For example, as the sound volume of the speaker increases, the color may change from white to black or green.

For example, when pressing is made, the MCU 200 may determine the operation. When the pressing is not made within the set time, the MCU 200 may determine that the operation is cancelled, and then return to the initial state.

As described above, the electronic device 1000D may include the input device 100D according to the exemplary embodiments using one manipulation unit 10D to allow various forms of input. This may improve design and ease of use.

[Switching of Function of Electronic Device by Tilting]

When a tilting force is applied to the handle 11D, a function of the electronic device may be switched according to a level of the tilting force.

Figure 32:
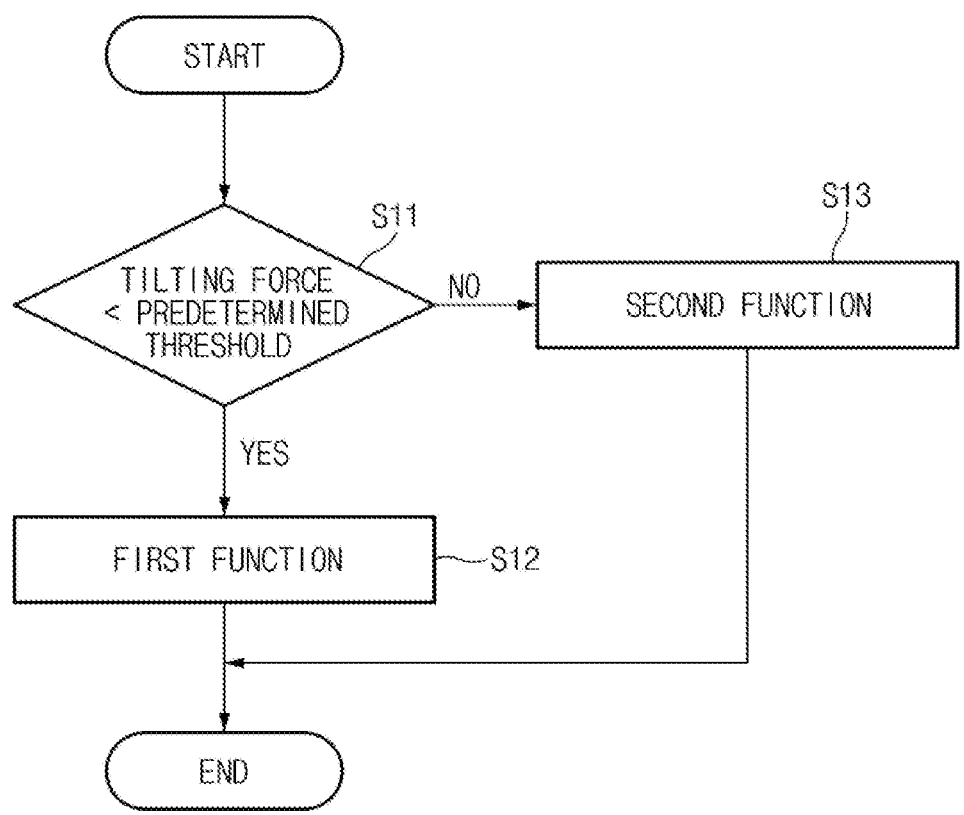
FIG. 32 is a flowchart of a process of switching a function of an electronic device by tilting.

Referring to FIG. 32, when the tilting force is applied to the handle 11D, the tilting force may be measured by a force-sensing device. The force-sensing device may be connected to the detector 33D, and the force-sensing device may be a force sensor such as a strain gauge.

It may be determined whether the tilting force is less than a predetermined threshold in operation S11. For example, the predetermined threshold may be 1N (newton).

When the measured tilting force is less than the predetermined threshold, the electronic device 1000D may perform a first function in operation S12. For example, when the electronic device 1000D is a vehicle audio system, the first function may be a function of adjusting the sound volume of the vehicle audio system.

When the measured tilting force is greater than the predetermined threshold, the electronic device 1000D may perform a second function in operation S13. For example, when the electronic device 1000D is the vehicle audio system, the second function may be a frequency tuning function of the vehicle audio system.

According to an alternative embodiment, the function of the electronic device may be switched according to the number of times the handle 11D of the input device 100D is tilted.

For example, it may be determined whether the number of tilting of the handle 11D is less than a predetermined threshold. When the number of tilting is less than the predetermined threshold (for example, two tilting movements), the electronic device 1000D may perform a first function (for example, sound volume adjustment), and when the number of tilting is greater than the predetermined threshold, the electronic device 1000D may perform a second function (for example, frequency tuning). The number of tilting may be detected by a counter connected to the MCU 200.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

INDUSTRIAL APPLICABILITY

The input device according to exemplary embodiments of the present disclosure may allow various forms of input to provide the output corresponding thereto. Thus, the input device according to exemplary embodiments of the present disclosure may be applied to various types of electronic devices.

The invention claimed is:

1. An input device comprising:
   a manipulation unit which includes a handle, allows rotation of the handle around a rotational axis and pressing of the handle along the rotational axis, and is configured to output a first signal according to the rotation of the handle and a second signal according to the pressing of the handle;
   a first substrate having a surface where the manipulation unit is attached;
   a second substrate on an opposite side of the first substrate from the manipulation unit;
   a tilting mechanism which includes a shaft in a circular cylindrical shape fixed to the first substrate perpendicularly to the rotational axis and a bearing fixed to the second substrate to rotatably support the shaft, and allows the first substrate to swing around the shaft between a first manipulation position and a second manipulation position relative to the second substrate;
   a detector mounted on a surface of the second substrate facing the first substrate, and configured to output a third signal when the first substrate is in the second manipulation position;
   a movable member attached to the first substrate, the movable member facing the second substrate; and
   an elastic member for transmitting elastic force to the first substrate to move the first substrate from the second manipulation position to the first manipulation position,
   wherein the movable member includes a protrusion and a support protruding from the movable member toward the second substrate,
   wherein the protrusion is at a first end in a longitudinal axis of the movable member, and the support is a second end in the longitudinal axis of the movable member, and
   wherein the elastic member is disposed around the protrusion, and the support is configured to be supported on the second substrate.

2. The input device according to claim 1, wherein the first signal is a signal indicative of a rotation angle around the rotational axis of the handle.

3. An input device comprising:
   a manipulation unit which includes a handle, allows rotation of the handle around a rotational axis and pressing of the handle along the rotational axis, and is configured to output a first signal according to the rotation of the handle and a second signal according to the pressing of the handle;
   a body holding the manipulation unit to allow it to move from a first manipulation position to a second manipulation position along a direction of the pressing of the handle;
   a first substrate having a surface where the manipulation unit is attached;
   a second substrate on an opposite side of the first substrate from the manipulation unit;
   a movable member attached to the first substrate; and
   a detector disposed on the second substrate, and configured to output a third signal when the manipulation unit is in the second manipulation position,
   wherein the movable member is formed with a recess for accommodating the first substrate, and the movable member includes multiple claws for keeping the first substrate inside the recess.

4. The input device according to claim 3, further comprising a recovery member for transmitting elastic force to the manipulation unit to move the manipulation unit from the second manipulation position to the first manipulation position.

5. An input device comprising:
- a manipulation unit which includes a handle, allows rotation of the handle around a rotational axis and pressing of the handle along the rotational axis, and is configured to output a first signal according to the rotation of the handle and a second signal according to the pressing of the handle;
- a body holding the manipulation unit to allow it to move from a first manipulation position to a second manipulation position along an opposite direction from a direction of the pressing of the handle;
- a first substrate having a surface where the manipulation unit is attached;
- a second substrate on an opposite side of the first substrate from the manipulation unit;
- a movable member attached to the first substrate; and
- a detector disposed on the first substrate, and configured to output a third signal when the manipulation unit is in the second manipulation position,
- wherein the movable member and the first substrate are configured to move toward the body by pulling of the handle, the body having a stopper protruding from the body toward the first substrate, and
- wherein the stopper is contactable with the first substrate.

6. The input device according to claim 5, further comprising a recovery member for transmitting elastic force to the manipulation unit to move the manipulation unit from the second manipulation position to the first manipulation position.

7. An input device, comprising:
- a manipulation unit including a handle which is rotatable around a rotation axis and is pressed along the rotation axis, and outputting a first signal corresponding to rotation of the handle and a second signal corresponding to pressing of the handle;
- a substrate having a surface to which the manipulation unit is attached;
- a body disposed to face the substrate;
- a tilting mechanism including a cylindrical shaft fixed to the substrate, and a bearing fixed to the body, the shaft being perpendicular to the rotation axis, the bearing rotatably supporting the shaft, and the tilting mechanism allowing the substrate to swing around the shaft between a first manipulation position and a second manipulation position; and
- a detector disposed on the surface of the substrate facing the body, and outputting a third signal when the substrate is in the second manipulation position.

8. The input device according to claim 7, wherein the substrate moves from the second manipulation position to the first manipulation position by its own weight.

* * * * *